(12) United States Patent
Takamori et al.

(10) Patent No.: US 7,682,678 B2
(45) Date of Patent: *Mar. 23, 2010

(54) OPTICAL INFORMATION RECORDING MEDIUM, RECORDING AND READOUT METHODS USING THE SAME, OPTICAL INFORMATION RECORDING DEVICE, AND OPTICAL INFORMATION READOUT DEVICE

(75) Inventors: Nobuyuki Takamori, Kitakatsuragi-gun (JP); Hideharu Tajima, Izumi (JP); Go Mori, Nara (JP); Masaki Yamamoto, Yamatokoriyama (JP)

(73) Assignee: Sharp Kabushiki Kaisha, Osaka-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/804,328

(22) Filed: Mar. 18, 2004

(65) Prior Publication Data
US 2004/0247815 A1    Dec. 9, 2004

(30) Foreign Application Priority Data
Jun. 6, 2003    (JP)    ............................ 2003-162871

(51) Int. Cl.
*B32B 3/02*    (2006.01)
(52) U.S. Cl. ................. 428/64.4; 428/64.5; 430/270.11
(58) Field of Classification Search ................ 428/64.1, 428/64.4, 64.5, 913; 430/270.11, 495.1, 430/945
See application file for complete search history.

(56) References Cited

U.S. PATENT DOCUMENTS

| | | | |
|---|---|---|---|
| 4,006,378 A | 2/1977 | Silverstein et al. | |
| 5,420,846 A | 5/1995 | Sugiyama et al. | |
| 5,474,874 A | 12/1995 | Asai et al. | |
| 5,516,568 A | 5/1996 | Jung | |
| 5,529,864 A | 6/1996 | Tachibana et al. | |

(Continued)

FOREIGN PATENT DOCUMENTS

EP    0 449 121 A2    10/1991

(Continued)

OTHER PUBLICATIONS

U.S. Appl. No. 10/824,926, filed Apr. 14, 2004, Hideharu Tajima, et al.

(Continued)

*Primary Examiner*—Bruce H Hess
(74) *Attorney, Agent, or Firm*—Edwards Angell Palmer & Dodge, LLP; David G. Conlin; Jonathan M. Sparks

(57) ABSTRACT

An optical information recording medium includes a substrate formed in a concave-convex state by providing pits or grooves corresponding to recorded information, used for optically reproducing the information by irradiation of a light beam, and may also include a recording layer. The optical information recording medium includes a temperature responsive layer 21 whose reflectance and/or transmittance for the light beam changes with an increase in temperature caused by the irradiation of a light beam and a light absorption layer 22. With such an arrangement, the present invention provides an optical information recording medium enabling secure and highly accurate readout of information recorded with high density, a recording method and a readout method using the same, a readout device, and a recording device.

37 Claims, 20 Drawing Sheets

U.S. PATENT DOCUMENTS

| | | | |
|---|---|---|---|
| 5,569,517 A | 10/1996 | Tominaga et al. | |
| 5,576,084 A * | 11/1996 | Kuroda | 428/64.1 |
| 5,591,500 A | 1/1997 | Kawanishi | |
| 5,610,879 A | 3/1997 | Moriya et al. | |
| 5,815,484 A * | 9/1998 | Smith et al. | 369/275.1 |
| 5,817,389 A * | 10/1998 | Ono | 428/64.1 |
| 6,187,406 B1 | 2/2001 | Ichihara et al. | |
| 6,339,582 B1 | 1/2002 | Ichihara et al. | |
| 6,524,766 B1 | 2/2003 | Ariyoshi et al. | |
| 6,551,679 B1 | 4/2003 | Kuroda et al. | |
| 6,589,657 B2 | 7/2003 | Dannenberg | |
| 6,638,593 B2 * | 10/2003 | Selinfreund et al. | 428/64.1 |
| 6,730,384 B2 * | 5/2004 | Yamamoto et al. | 428/64.1 |
| 6,790,502 B1 | 9/2004 | Yamamoto et al. | |
| 6,808,779 B2 * | 10/2004 | Rhee et al. | 428/64.1 |
| 6,844,092 B2 | 1/2005 | Yamamoto et al. | |
| 6,961,300 B2 * | 11/2005 | Cheong et al. | 369/275.1 |
| 2001/0038900 A1 | 11/2001 | Todori et al. | |
| 2002/0098315 A1 | 7/2002 | Tabata | |
| 2003/0002428 A1 | 1/2003 | Byung-ki et al. | |
| 2004/0240374 A1 * | 12/2004 | Tajima et al. | 369/275.4 |
| 2004/0264355 A1 * | 12/2004 | Takamori et al. | 369/275.2 |
| 2005/0007937 A1 * | 1/2005 | Mori et al. | 369/275.2 |
| 2005/0117505 A1 * | 6/2005 | Takamori et al. | 369/275.2 |

FOREIGN PATENT DOCUMENTS

| | | |
|---|---|---|
| EP | 0 580 346 A2 | 1/1994 |
| EP | 1 213 715 A2 | 6/2002 |
| JP | 05-012673 | 1/1993 |
| JP | 05-012715 | 1/1993 |
| JP | 06-028713 | 2/1994 |
| JP | 06-243508 | 9/1994 |
| JP | 07-223372 | 8/1995 |
| JP | 08-096412 | 4/1996 |
| JP | 08-111035 | 4/1996 |
| JP | 08-124217 | 5/1996 |
| JP | 2001-032935 | 2/2001 |
| JP | 2001-035011 | 2/2001 |
| JP | 2001-035012 | 2/2001 |
| JP | 2001-056961 | 2/2001 |
| JP | 2001-067727 | 3/2001 |
| JP | 2001-067731 | 3/2001 |
| JP | 2001-084643 | 3/2001 |
| JP | 2001-084645 | 3/2001 |
| JP | 2001-101707 | 4/2001 |
| JP | 2001-189033 | 7/2001 |
| JP | 2001-202657 | 7/2001 |
| JP | 2001-243657 | 9/2001 |
| JP | 2001-273679 | 10/2001 |
| JP | 2002-025057 | 1/2002 |
| JP | 2002-056573 | 2/2002 |
| JP | 2002-109786 | 4/2002 |
| JP | 2002-298439 | 10/2002 |
| JP | 2002-367230 | 12/2002 |
| JP | 2004-355783 | 12/2004 |
| KR | 20233/2001 | 3/2001 |
| WO | WO 02/058060 | 7/2002 |

OTHER PUBLICATIONS

U.S. Appl. No. 10/862,187, filed Jun. 4, 2004, Go Mori, et al.
U.S. Appl. No. 10/713,349, filed Nov. 14, 2003, Takamori, et al.
T. Shintani, et al., "A New Super-Resolution Film Application to Read-Only and Rewritable Optical Disks", Jpn. J. Appl. Phys. vol. 38 (1999) pp. 1656-1660, Part 1, N. 3B, Mar. 1999.

* cited by examiner

OPTICAL INFORMATION RECORDING MEDIUM, RECORDING AND READOUT METHODS USING THE SAME, OPTICAL INFORMATION RECORDING DEVICE, AND OPTICAL INFORMATION READOUT DEVICE

This Nonprovisional application claims priority under 35 U.S.C. § 119(a) on Patent Application No. 2003/162871 filed in Japan on Jun. 6, 2003, the entire contents of which are hereby incorporated by reference.

FIELD OF THE INVENTION

The present invention relates to an optical information recording medium, recording and readout methods using the same; and further relates to an optical information recording device, and an optical information readout device. More specifically, the present invention relates to an optical information recording medium for optically reproducing or both recording and reproducing information with an optical beam (e.g. a laser beam), such as an optical disk, in which recording density is improved by having a layer for changing the optical characteristic depending on temperature; recording and readout methods using such an optical information recording medium; an optical information recording device; and an optical information readout device.

BACKGROUND OF THE INVENTION

With the development of digitalization in the information-oriented society, there has been a demand for a writable medium which offers higher density recording and readout.

Under such a circumstance, there have been studies for various medium structures for a writable optical recording medium so as to improve its storage capacity. Also, in order to realize high density recording and readout, various methods have been attempted; for example, (i) a method of shortening wavelength of a laser beam used for recording and readout, (ii) a method of increasing NA (Numerical Aperture) of the objective lens used for condensing light onto the optical information recording medium, (iii) a method of providing multi-layered recording section to an optical information recording medium, and iv) a method of reducing the practical diameter of beam spot of a laser beam by providing a mask layer (also called a light-shutter layer), which blocks a part of the original diameter of the light.

This method of reducing the practical diameter of beam spot of a laser beam by providing a mask layer is described in Japanese Laid-Open Patent Application No. 5-12673/1993 (Tokukaihei 5-12673; published on Jan. 22, 1993) and Japanese Laid-Open Patent Application No. 5-12715/1993 (Tokukaihei 5-12715; published on Jan. 22, 1993), for example.

More specifically, Japanese Laid-Open Patent Application No. 5-12673/1993 discloses an optical disk device for performing recording and readout by using change of reflectivity which is occurred in a concavo-convex state due to pits on the substrate of the optical disk. This optical disk device is provided with a temperature dependent light shutter layer on the medium layer (on a surface of the disk to which a laser beam is emitted from the objective lens) for signal recording. The temperature dependent light shutter layer, which absorbs readout laser wavelength at ordinary temperature, stops absorption when the temperature rises by readout laser power, and starts the absorption again as the temperature drops after the readout light condensing spot.

Japanese Laid-Open Patent Application No. 5-12673/1993 further discloses another arrangement of an optical disk device for performing recording and readout by using change of reflectivity caused by phase change of the recording material. This optical disk device also includes the temperature dependent light shutter layer on the medium layer (on a surface of the disk toward which a laser beam is emitted from the objective lens) on which signals are recorded, which absorbs readout laser beam at ordinary temperature, and stops absorption when the temperature rises from readout laser power, and starts the absorption again as the temperature drops after passing through the readout light condensing spot.

Further, Japanese Laid-Open Patent Application 5-12715/1993 discloses an optical recording medium including a recording film on the substrate, in which a light shutter layer is provided on the recording film so that light irradiation for reading or recording incident on the recording film is blocked just before entering to the recording film. The light shutter layer contains a thermochromic material as its main component, which gives a color to the light shutter layer for preventing transmission of light before the light irradiation for reading is carried out, and then, when the light irradiation for reading is carried out and temperature rises, the central portion of the irradiation area in the light shutter layer decolorizes and becomes light-transmissive.

In the foregoing methods, the optical information recording medium having concave-convex pits or a recording film on the substrate is provided with a mask layer on surface receiving incident light toward the pits or the recording film. The mask layer is generally formed by a thermochromic material or a phase change material. In the central portion of the irradiation part of the mask layer, the temperature rises due to incident of the light irradiation for reading etc., and therefore the central portion of the irradiation part is optically or thermally reacted and partly loses the color to be light-transmissive. On the other hand, the temperature rises only slightly or does not rise at all in a portion receiving weak incident light, such as periphery of the irradiation part or a portion where light is not incident, and therefore, such a portion has a light blocking property. As a result, the practical spot size can be reduced to be equal to the size of the central part of the irradiation part. More specifically, the mask layer allows light transmission only in a portion having high light intensity distribution, thus practically reducing the spot diameter of the incident light. Accordingly, it becomes possible to carry out recording and readout with a small pit, which enables recording and readout of an optical information recording medium with high density. Note that, the central part of a rotating optical disk is an upper section of a readout beam spot 33 in FIG. 13 (in FIG. 13, high temperature area 33a).

The thermochromic material or the phase change material for the mask layer (light shutter layer) disclosed in Japanese Laid-Open Patent Application Nos. 5-12673/1993 and 5-12715/1993 shows the effect as a mask when the material is dissolved at a certain temperature. Since the material in the dissolved state has high fluidity, the original composition and formation of the material can be easily changed. Thus, in an optical information recording medium having such a mask layer showing the effect as a mask under a circumstance of a certain temperature, the mask effect will be gradually reduced due to the change of the original composition and formation, after a large number of recordings and/or readouts is performed; and eventually, the effect will be completely lost. Thus, the foregoing conventional optical information recording medium has insufficient durability.

Further, Japanese Laid-Open Patent Application No. 5-12673/1993 has such description that "This temperature dependent light transmittance changeable medium is formed by, for example, a polymeric material or an organic material . . . , a material whose transmittance is increased in a high temperature area may be adopted for such a material, for example. Such a change in transmittance may be caused by using a material whose light transmittance is increased from dissolution of the material, or may be caused by changing regularity of molecular alignment of a liquid crystal material. Further, the material may be a phase change material or the like, and the light transmittance of such a material can be changed, for example, by heating and cooling a chalcogenide in an amorphous state to cause crystallization." However, this description fails to describe a specific example of the material whose light transmittance is increased in a high temperature area. For this reason, the invention disclosed in Japanese Laid-Open Patent Application No. 5-12673/1993 cannot be realized by those in the art, based on common technologies at the time when Japanese Laid-Open Patent Application No. 5-12673/1993 is written or published.

SUMMARY OF THE INVENTION

The present invention is made in view of the foregoing demand for performing recording and readout with high density, and an object of the invention is to provide an optical information recording device capable of secure readout of information with high accuracy even when the information is recorded with high density; a recording method and a readout method using the medium; a readout device; and recording device.

In order to achieve the above object, an optical information recording medium according to the present invention which uses irradiation of a light beam for optically reproducing the information by having a concave and convex substrate provided with pits or grooves corresponding to the recorded information is further provided with a temperature responsive layer whose transmittance for irradiation of a light beam changes with an increase in temperature, and a light absorption layer which facilitates heating of the temperature responsive layer.

With the foregoing arrangement, it is possible to selectively carry out readout. More specifically, such selective readout can be carried out in a low transmittance area (a high temperature area or a low temperature area) smaller than the spot size of a readout light beam, thus providing an optical information recording medium enabling secure and highly accurate readout of information recorded with high density. Therefore, while a conventional method not using a temperature responsive layer fails to read out a pit or the like smaller than the readout spot size of the optical system, the present invention enables readout of such a small pit or the like with high readout signal strength. Moreover, the existence of the light absorption layer can easily heat the temperature responsive layer, thus improving the readout power sensitivity.

In order to achieve the above object, an optical information recording medium according to the present invention including a recording layer for optically recording information by irradiation of a light beam and optically reproducing the information by irradiation of a light beam is further provided with a temperature responsive layer whose transmittance for an irradiation light beam changes with an increase in temperature caused by the irradiation of a light beam, and a light absorption layer which facilitates heating of the temperature responsive layer.

With the foregoing arrangement, recording can be selectively carried out in an area smaller than the spot size of a recording light beam, thus providing an optical information recording medium enabling secure and highly accurate recording with high density, in contrast to an optical information recording medium not including a temperature responsive layer. Further, when information is recorded onto the recording layer, the foregoing arrangement enables selective readout of the information in an area smaller than the spot size of an irradiation light beam, as with the case above. Moreover, the existence of the light absorption layer can easily heat the temperature responsive layer, thus improving the readout power sensitivity. Therefore, the foregoing arrangement provides an optical information recording medium enabling secure and highly accurate readout of information recorded with high density, in contrast to an optical information recording medium not including a temperature responsive layer, and realizes a lower readout power with the light absorption layer. This results in improvement of readout resolution, thus realizing a density higher than the conventional density.

In order to achieve the above object, a readout method according to the present invention for an optical information recording medium, includes the steps of: irradiating the optical information recording medium with a light beam by providing a high temperature section and a low temperature section in a light beam spot of the temperature responsive layer so that the transmittance of the temperature responsive layer decreases in the high temperature section; and reproducing the information with a light transmitted through the low temperature section of the temperature responsive layer. Further, in order to achieve the above object, a readout method according to the present invention for an optical information recording medium, includes the steps of: irradiating the optical information recording medium with a light beam by providing a high temperature section and a low temperature section in a light beam spot of the temperature responsive layer so that the transmittance of the temperature responsive layer increases in the high temperature section; and reproducing the information with a light transmitted through the high temperature section of the temperature responsive layer.

With the foregoing methods, by reproducing information with a light transmitted through either the low temperature section or the high temperature section of the temperature responsive layer, the readout can be selectively carried out in an area smaller than the spot size of a readout light beam. Therefore, the foregoing arrangement makes it possible to securely and accurately reproduce information recorded on an optical information recording medium with high density.

In order to achieve the above object, a recording method according to the present invention for an optical information recording medium, includes the steps of: irradiating the optical information recording medium with a light beam by providing a high temperature section and a low temperature section in a light beam spot of the temperature responsive layer so that the transmittance of the temperature responsive layer decreases in the high temperature section; and heating a recording layer with a light transmitted through the low temperature section of the temperature responsive layer. Further, a recording method according to the present invention for an optical information recording medium, includes the steps of: irradiating the optical information recording medium with a light beam by providing a high temperature section and a low temperature section in a light beam spot of the temperature responsive layer so that the transmittance of the temperature responsive layer increases in the high temperature section;

and heating a recording layer with a light transmitted through the high temperature section of the temperature responsive layer.

With the foregoing methods, by heating the recording layer with a light transmitted through either the low temperature section or the high temperature section, the recording can be selectively carried out in an area smaller than the spot size of a recording light beam. Therefore, the foregoing arrangement makes it possible to securely and accurately record information on the recording layer with high density. Further, the existence of the light absorption layer can easily heat the temperature responsive layer, thus improving the readout power sensitivity.

A readout method of an optical information recording medium according to the present invention is a readout method for the foregoing optical information recording medium, and enables readout of a minute recording mark less than a diffraction limit of a readout light beam, using the temperature responsive layer and the light absorption layer. An optical information readout device according to the present invention is arranged to enable readout of a minute recording mark less than a diffraction limit of a readout light beam, using the foregoing optical information recording medium and the foregoing readout method.

With the foregoing arrangements, it is possible to reproduce information of a minute recording mark less than a diffraction limit of a readout light beam.

A recording method of an optical information recording medium according to the present invention is a recording method for the foregoing optical information recording medium, and enables recording of a minute recording mark less than a diffraction limit of a recording/readout beam, using at least the temperature responsive layer and the light absorption layer. An optical information recording device according to the present invention is arranged to enable recording of a minute recording mark less than a diffraction limit of a light beam, using the foregoing optical information recording medium and the foregoing recording method.

With the foregoing arrangements, it is possible to record information of a minute recording mark less than a diffraction limit of a recording/readout beam.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

Figure 1:
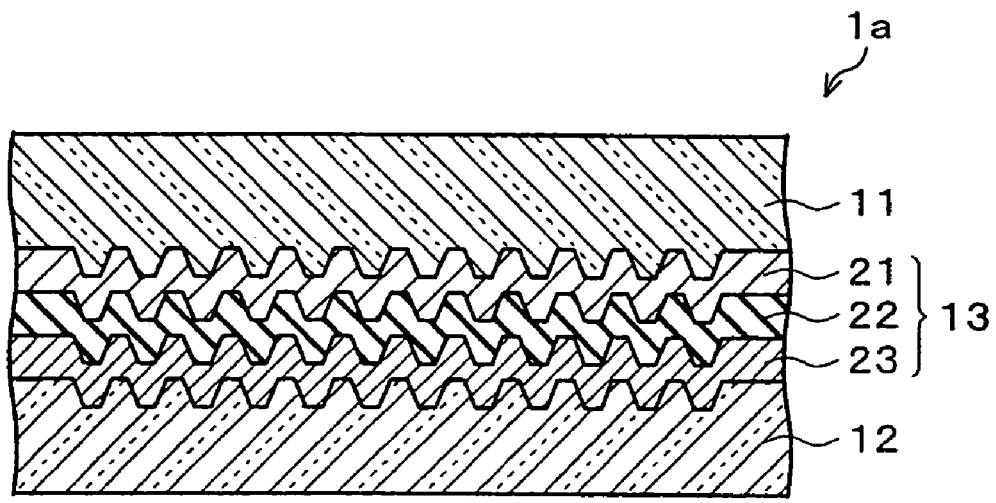
FIG. 1 is a partial cross sectional view illustrating a main portion of an optical information recording medium according to one Embodiment of the present invention.

One Embodiment of an optical information recording medium according to the present invention will be described below with reference to the drawings.

As shown in FIGS. 1, 3, 22, and 23, an optical information recording media according to the present Embodiment are readout-only optical information recording media 1a, 1c, and 1d, and are each constituted of a transparent resin layer 11, a temperature responsive reflection layer 13, and a substrate 12, which are formed in this order from the side receiving incident of a readout beam 30 (light beam used for readout). The temperature responsive reflection layer 13 is constituted of a temperature responsive layer 21, a light absorption layer 22, a reflection layer 23, and/or a heat insulation layer 24. That is, the temperature responsive reflection layer 13 of the optical information recording medium 1a is constituted of the temperature responsive layer 21, the light absorption layer 22, and the reflection layer 23. The temperature responsive reflection layer 13 of the optical information recording medium 1c is constituted of the temperature responsive layer 21, the light absorption layer 22, and the heat insulation layer 24. The temperature responsive reflection layer 13 of the optical information recording medium 1d is constituted of the temperature responsive layer 21, the light absorption layer 22, the reflection layer 23, and the heat insulation layer 24.

Thus, the optical information recording media 1a, 1c, and 1d each has such a structure that the temperature responsive reflection layer 13 is formed on the substrate 12, and the transparent resin layer 11 is further formed thereon. The readout beam 30 is incident on an internal face (the face facing the temperature responsive reflection layer 13) of the substrate 12 by passing through the transparent resin layer 11 and the temperature responsive reflection layer 13.

Note that, as described later, the temperature responsive layer 21 can be formed with a stable oxide, so that it is also possible to arrange an optical information recording medium not including the transparent resin layer 11, as shown in FIGS. 2, 4, 24, and 25 (optical information recording media 1b, 1e, and 1f).

The transparent resin layer 11 is transparent for the wavelength of the readout beam 30, so as to allow incident of the readout beam 30. With this arrangement, the optical information recording medium 1a receives incident light of the readout beam 30 from the transparent resin layer 11. The present invention does not particularly specify the material for constituting the transparent resin layer 11. For example, the material of the transparent resin layer 11 may be a thermoplastic transparent resin (plastic) such as a polycarbonate, an amorphous polyolefin, a thermoplastic polyimide, a PET (Polyethylene Terephthalate), a PEN (Polyether Nitrile), or a PES (Polyether Sulfone); a thermosetting transparent resin such as a thermosetting polyimide or an ultraviolet-curing acrylic resin; or a composition of any of these materials. Though its general desirable range of thickness is approximately 1 μm–100 μm, the transparent resin layer 11 may have a thickness around 0.1 mm–1.2 mm for offering appropriate strength of the optical information recording medium 1a. Note that, the transparent resin layer 11 may instead be a layer made of other kinds of transparent material, for example, a glass or a composition of a glass and a transparent resin. The appropriate thickness of such a layer is approximately 0.1 mm–1.2 mm.

The material for constituting the substrate 12 is required to offer an appropriate strength of the optical information recording medium 1a. The optical characteristic of the material of the substrate 12 is however not particularly limited, and therefore the material does not have to be transparent. The material of the substrate 12 may be a glass; a thermoplastic transparent resin such as a polycarbonate, an amorphous polyolefin, a thermoplastic polyimide, a PET, a PEN, or a PES; a thermosetting transparent resin such as a thermosetting polyimide or an ultraviolet-curing acrylic resin; a metal; or a composition of any of these materials. The thickness of the substrate 12 is preferably 0.3 mm–1.2 mm, however not particularly limited. Further, an appropriate pitch for the pits is approximately 0.3 μm–1.6 μm and an appropriate depth of the pitch is approximately 30 nm–200 nm. Further, for the guiding grooves, an appropriate range is approximately 0.3 μm–1.6 μm for the pitch, and approximately 30 nm–200 nm for the depth.

The substrate 12 includes pits for creating a concave-convex surface and guiding grooves on its internal face (the face facing the temperature responsive reflection layer 13). The substrate 12 may include both the pits and the grooves, or either of the pits and the grooves.

The temperature responsive reflection layer 13 has such a function that the light transmittance and/or reflectance with respect to the wavelength of the readout beam 30 changes with a change in temperature from irradiation of the readout beam 30. With this arrangement, selective readout can be carried out in an area smaller than the spot size of the readout light beam 30. The temperature responsive reflection layer 13 is constituted of the temperature responsive layer 21, the light absorption layer 22, the reflection layer 23, and/or the heat insulation layer 24. For example, in the basic optical information recording medium 1a shown in FIG. 1, the temperature responsive reflection layer 13 is constituted of the temperature responsive layer 21, the light absorption layer 22, and the reflection layer 23 in this order from the side receiving the light (readout beam 30) irradiation, i.e., from the side having the transparent resin layer 11. That is, the temperature responsive reflection layer 13 is constituted of the reflection layer 23, light absorption layer 22, and the temperature responsive layer 21 in this order on the substrate 12.

The temperature responsive layer 21 has such a function that the light transmittance with respect to the wavelength of the readout beam 30 changes with a rise in temperature of the light absorption layer 22 due to irradiation of the readout beam 30. The temperature responsive layer 21 contains a translucent material whose transmittance reversibly changes as the temperature changes; more specifically, the transmittance with respect to the wavelength of the readout light beam changes as the temperature increases. As an example of the material for constituting the temperature responsive layer 21, preferably adopted is a material causing a change of the transmittance of the temperature responsive layer 21 with a rise in temperature in a certain wavelength range; to be more specific, when the temperature rises from 20° C. to 18° C., the light transmittance of the temperature responsive layer 21 changes in a range of ±80%. One example of such a material may be a thermochromic material whose transmittance is changed when the chemical structure is changed upon heat absorption. A specific example of the thermochromic material whose transmittance decreases with a change of the temperature may be an inorganic thermochromic material such as a metal oxide, or an organic thermochromic material such as a lactone, a fluorane, or the like which is mixed with an alkali; or a leuco dye material or the like mixed with an organic acid. The most preferable material among these is a metal oxide, which changes the width of its forbidden band with a change of temperature, and changes the transmittance of wavelengths of its absorption edge. With this characteristic, the metal oxide is not likely to change its composition or structure even when it causes a chemical change of structure due to a change of temperature, and therefore it is superior in durability. For example, ZnO (Zinc Oxide) in particular, $SnO_2$, $CeO_2$, $NiO_2$, $In_2O_3$, $TiO_2$, $Ta_2O_5$, $VO_2$, $SrTiO_3$, or the like can be used as the metal oxide material. The thickness of temperature responsive layer 21, which depends on the material, is preferably not less than 100 nm, and more appropriately in a range of 500 nm–800 nm. Accordingly, the preferred material of the temperature responsive layer 21 is a ZnO (Zinc Oxide) film with a thickness of equal to or greater than 100 nm.

The light absorption layer 22 facilitates a change in temperature of the temperature responsive layer 21 from irradiation of the readout beam 30. More specifically, the light absorption layer 22 has a function of changing the quantity of light absorbed in the temperature responsive layer 21 (reflectance and/or transmittance of the temperature responsive layer 21). The light absorption layer 22 is preferably made of material which absorbs a readout laser beam (readout beam 30) to exchange it into heat. Specifically, examples of the material for the light absorption layer 22 include: Si film; Ge film; phase change film such as AgInSbTe film or GeSbTe film; magnetooptical film such as TbFeCo film, DyFeco film, or GdFeCo film; and alloy film of the aforementioned materials. Especially, the material for the light absorption layer 22 is most preferably Si film. The thickness of the light absorption layer 22, which depends on the material, can be adjusted and is preferably not less than 10 nm, and more appropriately in a range of 5 nm–300 nm. Accordingly, the preferred material of the light absorption layer 22 is a Si (Silicon) film with a thickness of equal to or greater than 10 nm.

Note that, as shown in FIG. 1, it is preferable that the temperature responsive layer 21 and the light absorption layer 22 are adjacent to each other. With this arrangement, for example, the light absorption layer 22 can effectively increase a temperature of the temperature responsive layer 21 by absorbing the readout beam 30 to exchange it into heat. However, the temperature responsive layer 21 and the light absorption layer 22, which do not necessarily require to be adjacent to each other, it is essential only that the temperature responsive layer 21 and the light absorption layer 22 are close to each other in a range where the temperature responsive layer 21 changes in temperature. For example, another layer (a layer to bring about the effect of multiple reflection by interference of light (transparent dielectric layer) may be formed between the temperature responsive layer 21 and the light absorption layer 22.

The reflection layer 23 reflects light transmitted through the temperature responsive layer 21 and the light absorption layer 22. The reflection layer 23 is preferably made of a metal film with high reflectance, such as an Al film, an Au film, an Ag film, or an alloy film of any of these metals. The thickness of the reflection layer 23 is not particularly limited and may be specified to realize a desired reflectance. For example, the thickness may be in a range of 20 to 100 nm, for example.

Further, the temperature responsive reflection layer 13 can have a structure not only in the basic optical information recording medium 1a in FIG. 1, but also in optical information recording media 1b through 1f respectively in FIGS. 22 through 25. That is, in the present invention, it is essential only that the temperature responsive reflection layer 13 has the reflection layer 23 and/or the heat insulation layer 24, in addition to the temperature responsive layer 21 and the light absorption layer 22.

More specifically, as in the optical information recording media 1c and 1e (see FIGS. 22 and 24, respectively), the temperature responsive reflection layer 13 may have such a structure having the heat insulation layer 24, instead of the reflection layer 23 of the optical information recording medium 1a. In such a structure, reflection efficiency of light transmitted through the temperature responsive layer 21 and the light absorption layer 22 is worse than that in a structure including the reflection layer 23. However, the heat insulation layer 24 is adiathermic, so that the structure having the heat insulation layer 24 allows more efficient rise in temperature of the temperature responsive layer 21 with heat generated in the light absorption layer 22 than the structure not including the heat insulation layer 24.

As in the optical information recording media 1d and 1f (see FIGS. 23 and 25, respectively), the temperature responsive reflection layer 13 may have a structure having the heat insulation layer 24 between the light absorption layer 22 and the reflection layer 23 of the optical information recording medium 1a. The optical information recording medium 1a having such a structure has an advantage of efficiently reflecting light transmitted through the heat insulation layer 24 with the reflection layer 23, in addition to the aforementioned advantage of the optical information recording media 1c and 1e (i.e. efficient rise in temperature of the temperature responsive layer 21).

Note that, the material of the heat insulation layer 24 is not particularly limited provided that it has low thermal conductivity. Note that, in the case of an optical information recording medium including the reflection layer 23, the heat insulation layer 24 is preferably transparent. In the case of an optical information recording medium not including the reflection layer 23, the heat insulation layer 24 is preferably made of material having high reflectance. Examples of the material of the heat insulation layer 24 include SiN film and AlN film, and the preferred material of the heat insulation layer 24 is SiN film. The thickness of the heat insulation layer 24, which is not particularly limited, can be adjusted so as to be a thickness which realizes a desired transmittance or reflectance. For example, the thickness of the heat insulation layer 24 can be approximately 20 nm–100 nm.

Note that, in the optical information recording media 1a through 1f, not only the refection layer 23 or the heat insulation layer 24, but also the temperature responsive layer 21 and the light absorption layer 22 reflect light incident thereon.

With such a structure, readout-only optical information recording media 1a through 1f, which do not include a recording film, are realized. These optical information recording media 1a through 1f can be a CD (Compact Disc), a CD-ROM (Compact Disc Read Only Memory), a DVD (Digital Versatile Disc), a DVD-ROM (Digital Versatile Disc Read Only Memory), for example.

Next, the following will explain one example of a readout method of the optical information recording medium 1a.

The optical information recording medium 1a can be reproduced by using a laser light source (not shown) and an optical system such as a light condensing lens 31, in such a manner that the readout beam 30 is incident on the internal face (the face provided with either of pits or grooves) of the substrate 12 through the transparent resin layer 11, and the light reflected on the face is detected by an optical head (not shown).

Figure 13:
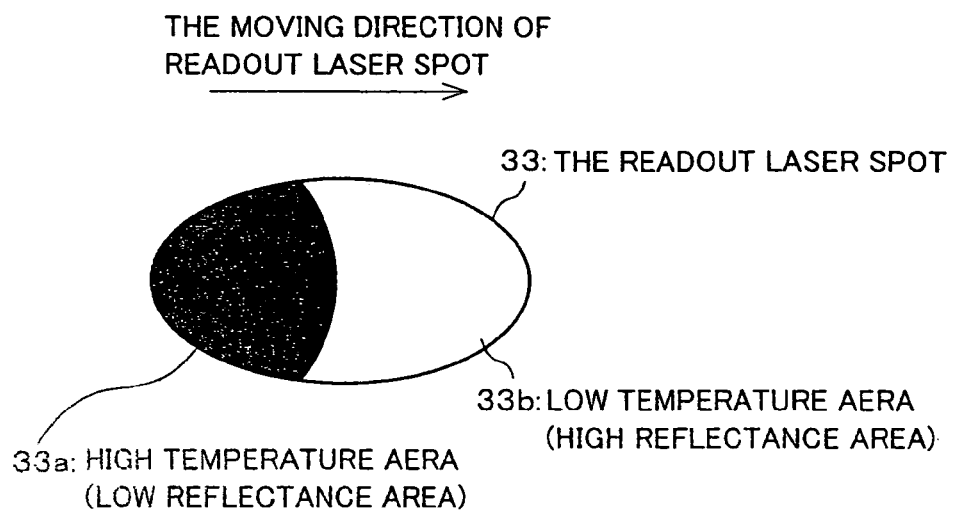
FIG. 13 is a drawing for explaining a mask effect of a temperature responsive reflection layer, and illustrates temperature distribution and reflectivity distribution in a readout beam spot of the temperature responsive reflection layer.

Here, the irradiation of the readout beam 30 with respect to the optical information recording medium 1a is carried out by providing a high temperature section and a low temperature section in the light beam spot of the temperature responsive layer 21. For example, when the readout beam 30 is incident on the side having the transparent resin layer 11 and scans the front surface of the readout-only optical information recording medium 1a in a predetermined direction, there arises temperature gradient in a readout beam spot 33 of the front surface of the temperature responsive layer 21 in a traveling direction of the readout beam spot 33, as shown in FIG. 13. As a result, the readout beam spot 33 of the front surface of the temperature responsive layer 21 has a high temperature section 33a and a low temperature section 33b. The temperature in the high temperature section 33a is equal to or greater than 60° C. and less than 180° C., and the temperature of the low temperature section 33b is equal to or greater than 20° C. and less than 60° C.

As mentioned previously, the temperature responsive layer 21 changes its transmittance with a change in temperature. For example, when the temperature responsive layer 21 decreases its transmittance with a rise in temperature, in the high temperature section 33a where the temperature rises upon incident of the readout beam 30, the transmittance of the temperature responsive layer 21 with respect to the wavelength of the readout beam 30 decreases (in a low transmittance state). As a result of this, much of the incident light onto the optical information recording medium 1a is blocked by the temperature responsive layer 21. Accordingly, the quantity of light transmitted through the temperature responsive layer 21 decreases. This decreases the quantity of light incident on the reflection layer 23 formed on the rear surface (on the side having the substrate 12) of the temperature responsive layer 21. As a result, since the quantity of light reflected by the reflection layer 23 is reduced, the high temperature section 33a turns to be a low reflectance state (becomes a low reflectance area) on the whole of the temperature responsive reflection layer 13.

On the other hand, in the low temperature section 33b having lower temperature than that of the high temperature section 33a, the transmittance of the temperature responsive layer 21 with respect to the wavelength of the readout beam 30 is not changed by irradiation of the readout beam 30. Therefore, the transmittance of the low temperature section 33b is relatively higher than that of the high temperature section 33a. As a result of this, the quantity of light incident on the reflection layer 23 on the rear surface (on the side having the substrate 12) of the temperature responsive layer 21 also increases. Accordingly, the quantity of light reflected by the reflection layer 23 increases. As a result, the low temperature section 33b turns to be a high reflectance state (becomes a high reflectance area) on the whole of the temperature responsive reflection layer 13.

In addition, the optical information recording medium 1a has the light absorption layer 22 facilitating a change in temperature of the temperature responsive layer 21. Upon irradiation of the readout beam 30, the light absorption layer 22 absorbs the readout beam 30 to exchange it into heat. Since the light absorption layer 22 and the temperature responsive layer 21 are close (preferably adjacent) to each other, heat generated in the high temperature section 33a of the light absorption layer 22 transfers to the temperature responsive layer 21. As a result of this, the high temperature section 33a of the temperature responsive layer 21 has a higher temperature. More specifically, the temperature differentials between the low temperature section 33b and the high temperature section 33a become large, so that the transmittance of the high temperature section 33a in the temperature responsive layer 21 becomes lower. With this arrangement, light can be blocked by the temperature section 33a much more than the arrangement not including the light absorption layer 22.

Further, in addition to this, the optical information recording media 1c through 1f including the heat insulation layer 24, as shown respectively in FIGS. 22 through 25, heat generated in the light absorption layer 22 transfers to the temperature responsive layer 21 more efficiently, so that light is further blocked by the high temperature section 33a.

To be more specific, the temperature responsive reflection layer 13 is turned to low reflectance state with the temperature equal to or greater than 60° C. and less than 180° C., and is turned to high reflectance state with the temperature equal to or greater than 20° C. and less than 60° C., for example. Further, the temperature responsive reflection layer 13 is more efficiently turned to low reflectance state by having the light absorption layer 22 and the heat insulation layer 24.

In the temperature responsive layer 21 in such a condition, there arises a difficulty in transmission of the readout beam 30 in the later half of the readout beam spot 33, i.e., the high temperature section 33a. Therefore, the readout of information is carried out by using the light which is transmitted through the low temperature section 33b, and substantially blocked by the high temperature section 33a of the temperature responsive layer 21. More specifically, upon readout, since the high temperature section 33a operates as a mask of the substrate 12, the optical head detects the light transmitted through the low temperature section 33a where the temperature does not rise, as the reflection light of the surface of the substrate 12. On this account, it is possible to reduce the size of the readout area in the front surface (the surface where information is recorded) of the substrate 12 which is provided with pits or grooves to be smaller than the readout beam spot 33 on the temperature responsive reflection layer 13. Accordingly, the size of the readout area can be further reduced, and readout resolution can be improved. Therefore, it becomes possible to securely reproduce information corresponding to the minute pits and/or grooves provided on the front surface (the surface where information is recorded) of the substrate 12, particularly the pits and/or grooves less than the diffraction-limit of the readout light beam, with a greater readout signal strength. As described, with such a manner, the optical information recording medium according to the present Embodiment uses the temperature responsive layer 21, the light absorption layer 22, the reflection layer 23, and/or the heat insulation layer 24 to be capable of reproducing minute recording marks provided as pits or grooves on the front surface (the surface for recording information) of the substrate 12 even when the marks are less than the diffraction-limit of the readout light beam.

Figure 14:
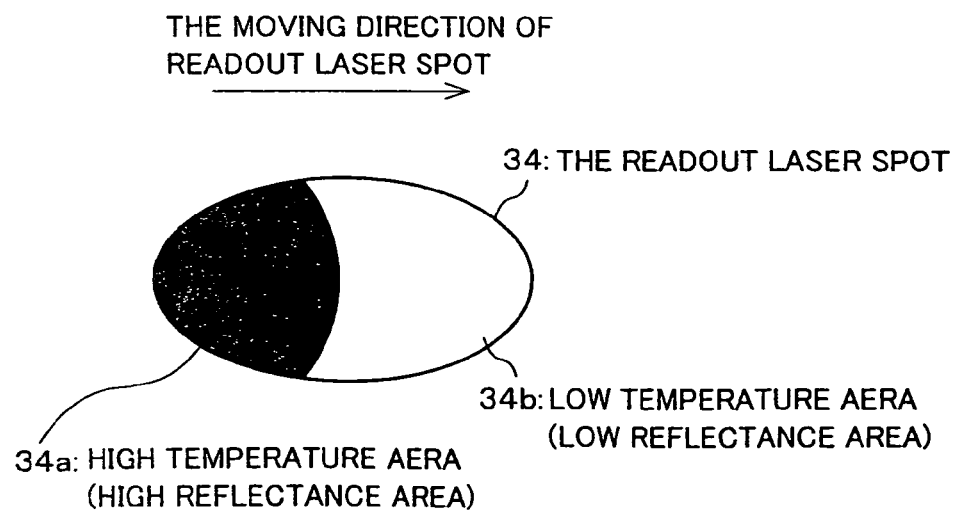
FIG. 14 is a drawing for explaining a mask effect of a temperature responsive reflection layer, and illustrates temperature distribution and reflectivity distribution in a readout beam spot of the temperature responsive reflection layer.

Note that, with reference to FIG. 13, the above described is the readout method of the optical information recording medium where the temperature responsive layer 21 decreases its transmittance with a rise in temperature. In contrast, as shown in FIG. 14, the readout method of the optical information recording medium where the temperature responsive layer 21 increases its transmittance with a rise in temperature is about the same as the above readout method, except that the high temperature section 34a of the readout beam spot 34 turns to be a high reflectance state (high reflectance area), and the low temperature section 34b of the readout beam spot 34 turns to be a low reflectance state (low reflectance area). That is, in the temperature responsive layer 21, there arises a difficulty in transmission of the readout beam 30 in the first half of the readout beam spot 34, i.e., the low temperature section 33b. Therefore, light is substantially blocked by the low temperature section 34b of the temperature responsive layer 21, and the readout of information is carried out with the light transmitted through the high temperature section 34a. More specifically, upon readout, since the low temperature section 34b operates as a mask of the substrate 12, the optical head detects the light transmitted through the high temperature section 34a where the temperature rises, as the reflection light of the surface of the substrate 12.

Further, the mask layer for increasing the transmittance of the high temperature section used in the aforementioned Japanese Laid-Open Patent Application No. 5-12673/1993 is made of a thermochromic material, a phase change material, or other material, which operates as a mask in a dissolved state when temperature becomes a certain level or greater. Such a mask layer, however, causes a problem of a decrease of the mask effect when the recording and/or readout is repeatedly performed.

On the contrary, the optical information recording medium 1a of the present Embodiment uses the temperature responsive layer 21 to decrease or increase the transmittance of the high temperature section 33a or 34a. Further, the light absorption layer 22 causes a further rise in temperature of the high temperature section 33a or 34a of the temperature responsive layer 21. Moreover, the heat insulation layer 24 enables a further efficient increase in temperature of the high temperature section 33a or 34a in the temperature responsive layer 21. Since the temperature responsive layer 21 can be made of a metal oxide or the like, which is not dissolved when the temperature rises upon recording or readout, the mask effect of the temperature responsive layer 21 does not decrease even when recording and/or readout is repeatedly performed. On this account, the optical information recording medium 1a of the present Embodiment is superior in durability.

Still further, the optical information recording medium 1a of the present Embodiment has such a structure that the light absorption layer 22 and the reflection layer 23 are formed on the temperature responsive layer 21 on a surface opposite to that irradiated with a light beam, and the temperature responsive layer 21, the light absorption layer 22, and the reflection layer 23 constitute the temperature responsive reflection layer 13 in which the reflectance with respect to an irradiation light beam decreases with the rise of temperature from the light beam irradiation. This structure is based on a reflection-type, super-resolution readout method. The principle of the reflection-type, super-resolution readout method is fundamentally different to that of the super resolution readout method which adds a mask layer to a light beam irradiation surface so as to change the transmittance, i.e. the super resolution readout method using material which dissolves with a rise in temperature upon recording and/or readout (Japanese Laid-Open Patent Application Nos. 5-12673/1993 and 5-12715/1993, and others).

In order to decrease the spectral transmittance with respect to the wavelength of the readout light beam, the temperature responsive layer 21 is preferably arranged so that a low transmittance area generated by the absorption of a shorter wavelength at an ordinary temperature includes the wavelength of the readout light beam; and when the low transmittance area generated by the absorption of a shorter wavelength is shifted to a direction toward a longer wavelength or a shorter wavelength. Further, in order to decrease the spectral transmittance with respect to the wavelength of the readout beam 30, the temperature responsive layer 21 is preferably arranged so that the wavelength of the absorption edge (a lower limit of the absorption band existing in an ultraviolet/visible area) in the shorter wavelength side is shorter at an ordinary temperature than the wavelength of the readout beam 30; and the absorption edge of the shorter wavelength side is shifted to the longer wavelength side or the shorter wavelength side depending on a rise of the temperature. For example, when the wavelength of the readout beam 30 is in a range from 380 nm to 415 nm (408 nm, for example), the temperature responsive layer 21 is preferably made of a ZnO film whose wavelength in the absorption edge on the shorter wavelength side is around 375 nm at an ordinary temperature.

Figure 15:
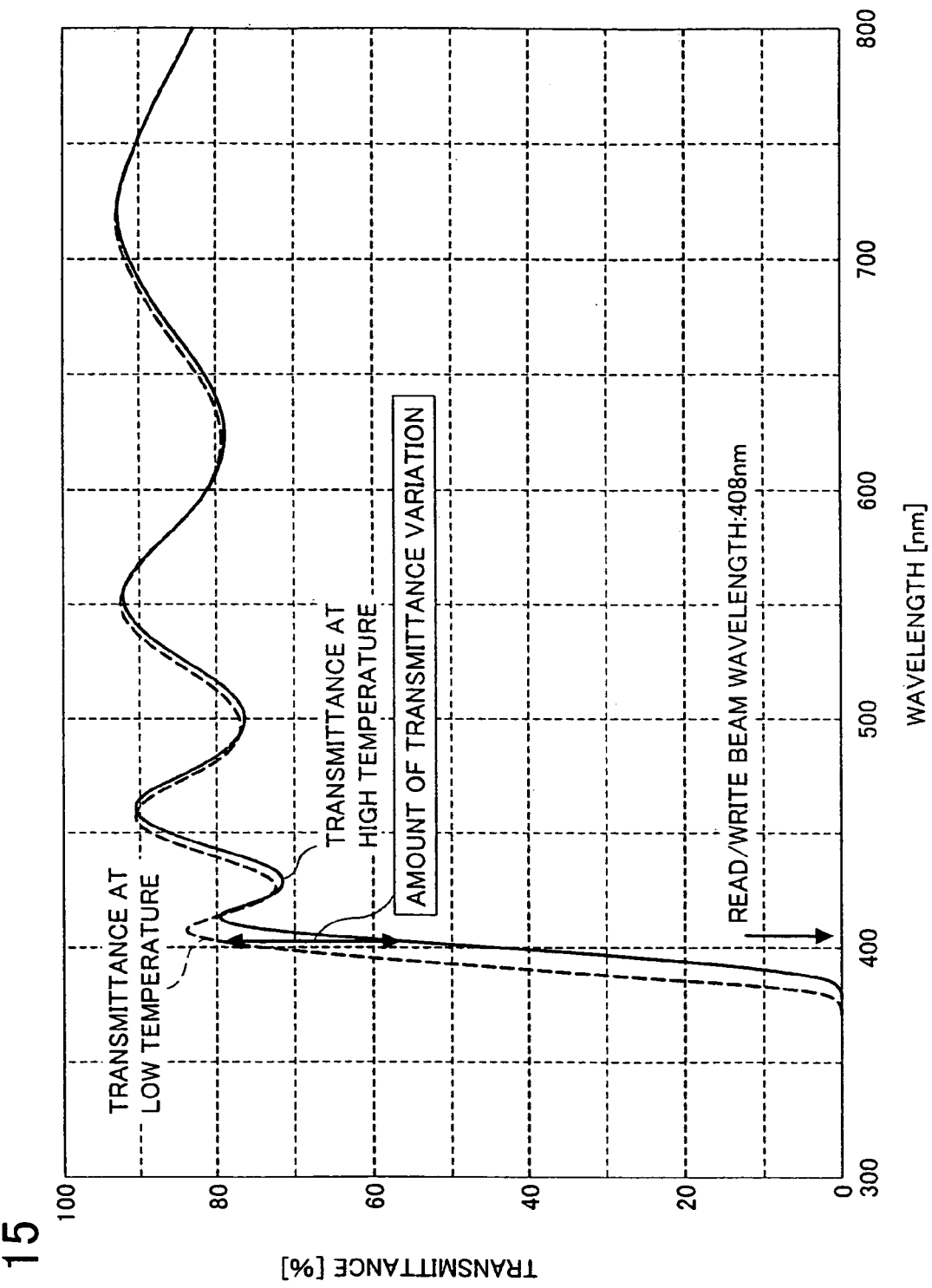
FIG. 15 is a graph showing an example of a change in temperature of spectral transmittance characteristic of the temperature responsive layer.

As can be seen in FIG. 15, which shows the spectral transmittance characteristic of a ZnO film, the wavelength in the absorption edge in the shorter wavelength side is shifted to the longer wavelength side with rise of the temperature. As a result, transmittance of the ZnO film decreases in the high temperature section 33a where the temperature has risen due to incident of light, since the spectral transmittance of the wavelength of the readout beam 30 decreases. Note that, the light transmittance in the ZnO film is kept high in the low temperature section 33b where the temperature is relatively low. Further, in the portion of the ZnO film where the temperature rises, the absorption edge in the shorter wavelength side of the spectral transmittance characteristic is shifted back to the shorter wavelength side when the temperature goes back to low again, and the spectral transmittance increases. With this effect, degree of modulation (change of spectral transmittance in the wavelength of the readout beam 30 between the high temperature section 33a and the low temperature section 33b) can be increased. In addition to this, the light absorption layer 22 increases the temperature of the high temperature section 33a. This makes it more difficult to transmit the readout beam 30 through the high temperature section 33a, thus surely realizing high readout signal strength.

Figure 16:
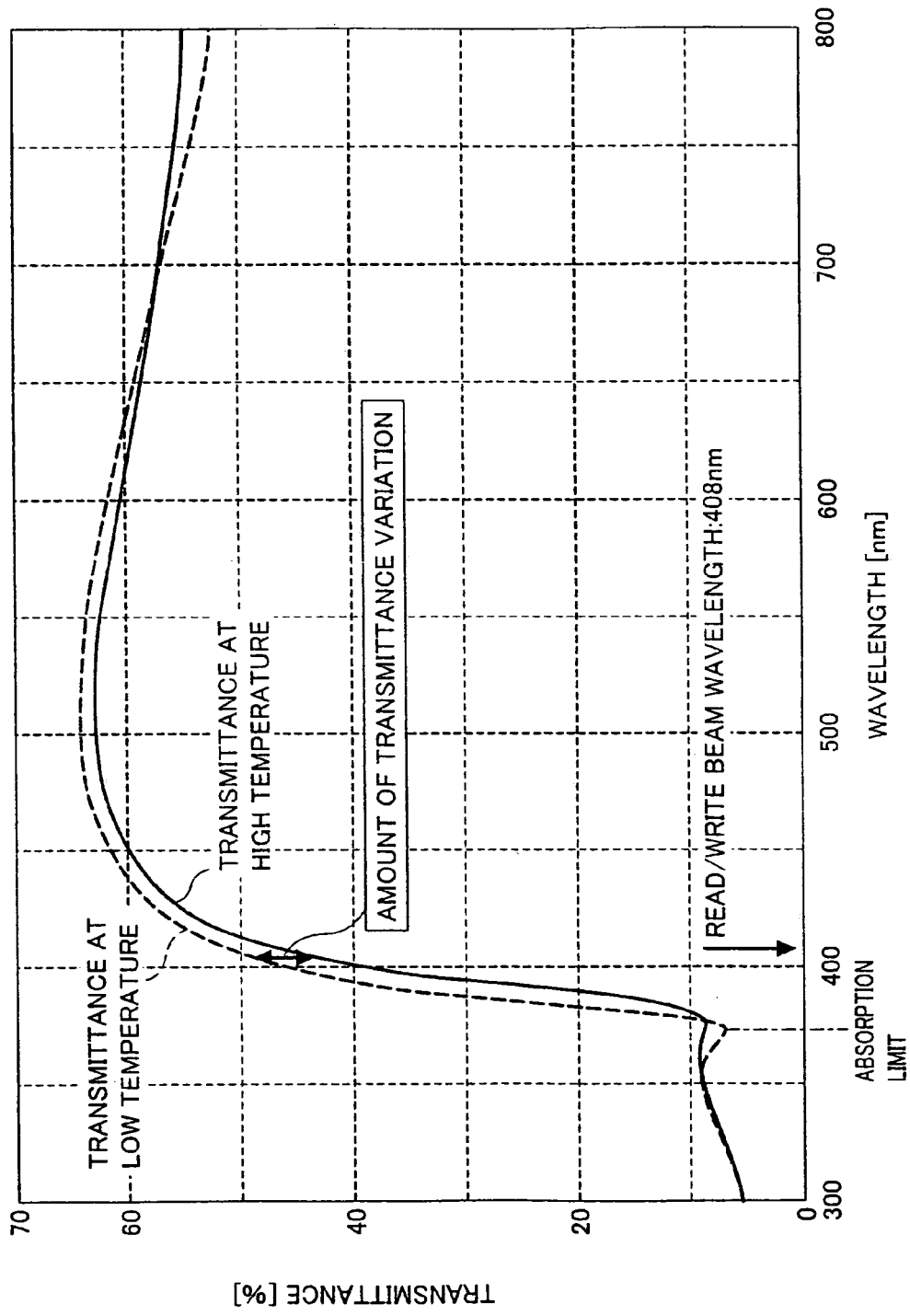
FIG. 16 is a graph showing an example of a change by temperature of spectral transmittance characteristic of the temperature responsive reflection layer not including a light absorption layer, and shows a case where the temperature responsive layer has a small thickness, and there exists no minimum value caused by an optical interference effect.
Figure 17:
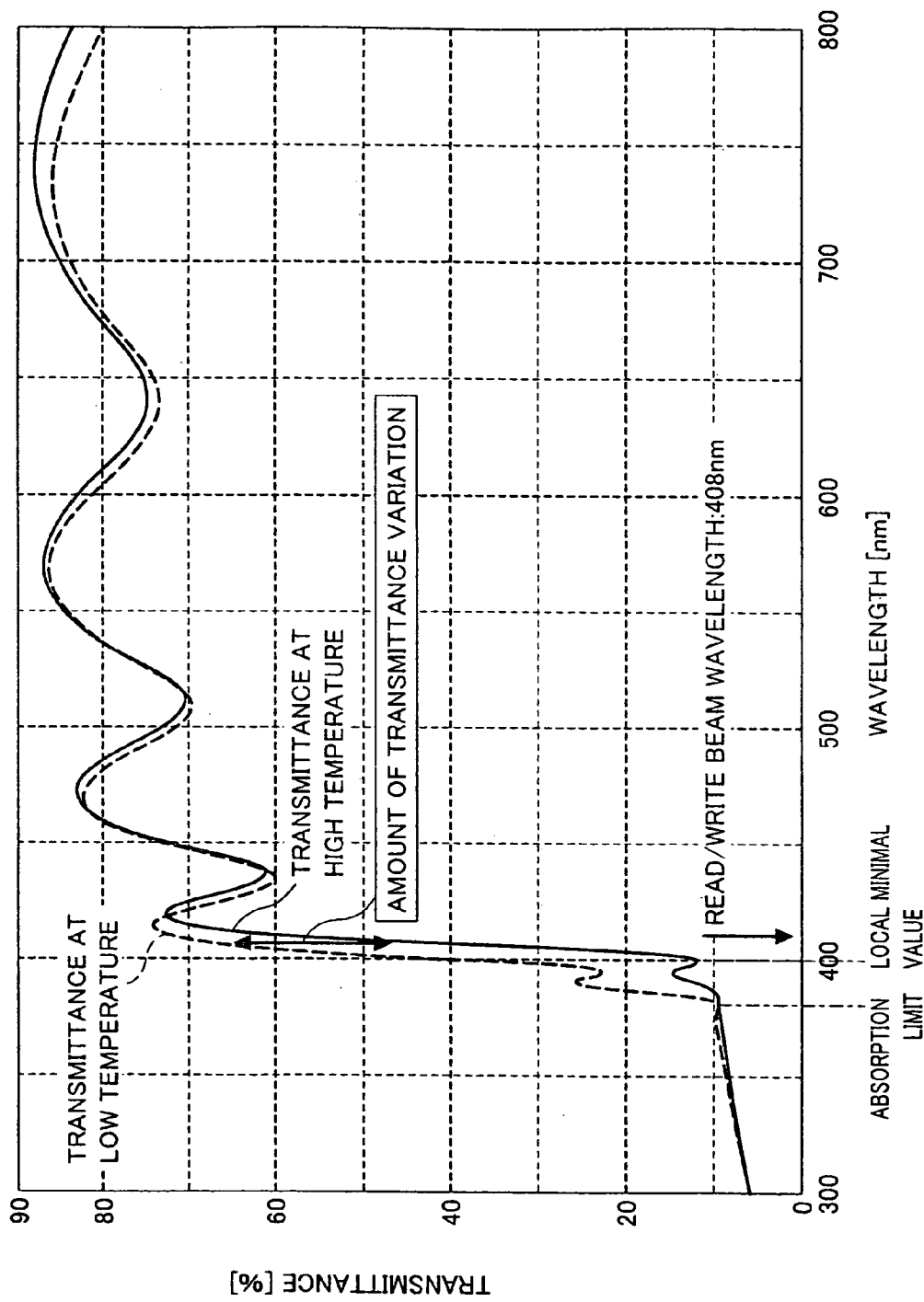
FIG. 17 is a graph showing another example of a change by temperature of spectral transmittance characteristic of the temperature responsive layer not including a light absorption layer, and shows a case where the temperature responsive layer has a large thickness, and there exists a minimum value caused by an optical interference effect.

Further, in the temperature responsive layer 21, the change of the temperature of the transmittance characteristic is preferably controlled by using optical interference effect due to light interference between the reflection light on one surface and the reflection light on the other surface. For the spectral reflectance characteristic of the temperature responsive layer 21, it is preferable that the minimum value caused by the optical interference effect between the reflection light on one surface and the reflection light on the other surface exists in the vicinity (preferably within ±20 nm, further preferable within ±10 nm) of the wavelength of the light beam. When the temperature responsive layer 21 has a large thickness of equal to or greater than 200 nm, there causes the optical interference effect between the reflection light on one surface and the reflection light on the other surface. For example, a film not including the light absorption layer 22, made up of a zinc oxide film (400 nm; temperature responsive layer 21) and an aluminum film (reflection layer 23), as shown in FIG. 17, has a minimum value (400 nm in FIG. 17) of the spectral reflectance characteristic of the temperature responsive reflection layer 13, resulting from the optical interference effect. With this effect, inclination of the reflectance in the vicinity of the absorption edge becomes steeper, and the degree of modulation (change of spectral transmittance in the wavelength of the readout beam 30 between the high temperature section 33a and the low temperature section 33b) can be increased. This makes it more difficult to transmit the readout beam 30 through the high temperature section 33a, thus surely realizing high readout signal strength. Note that, the aluminum film having a thickness less than 40 nm does not cause such an optical interference effect, and therefore the spectral reflectance characteristic of the aluminum film has no minimum values, as shown in FIG. 16, for example.

Figure 18:
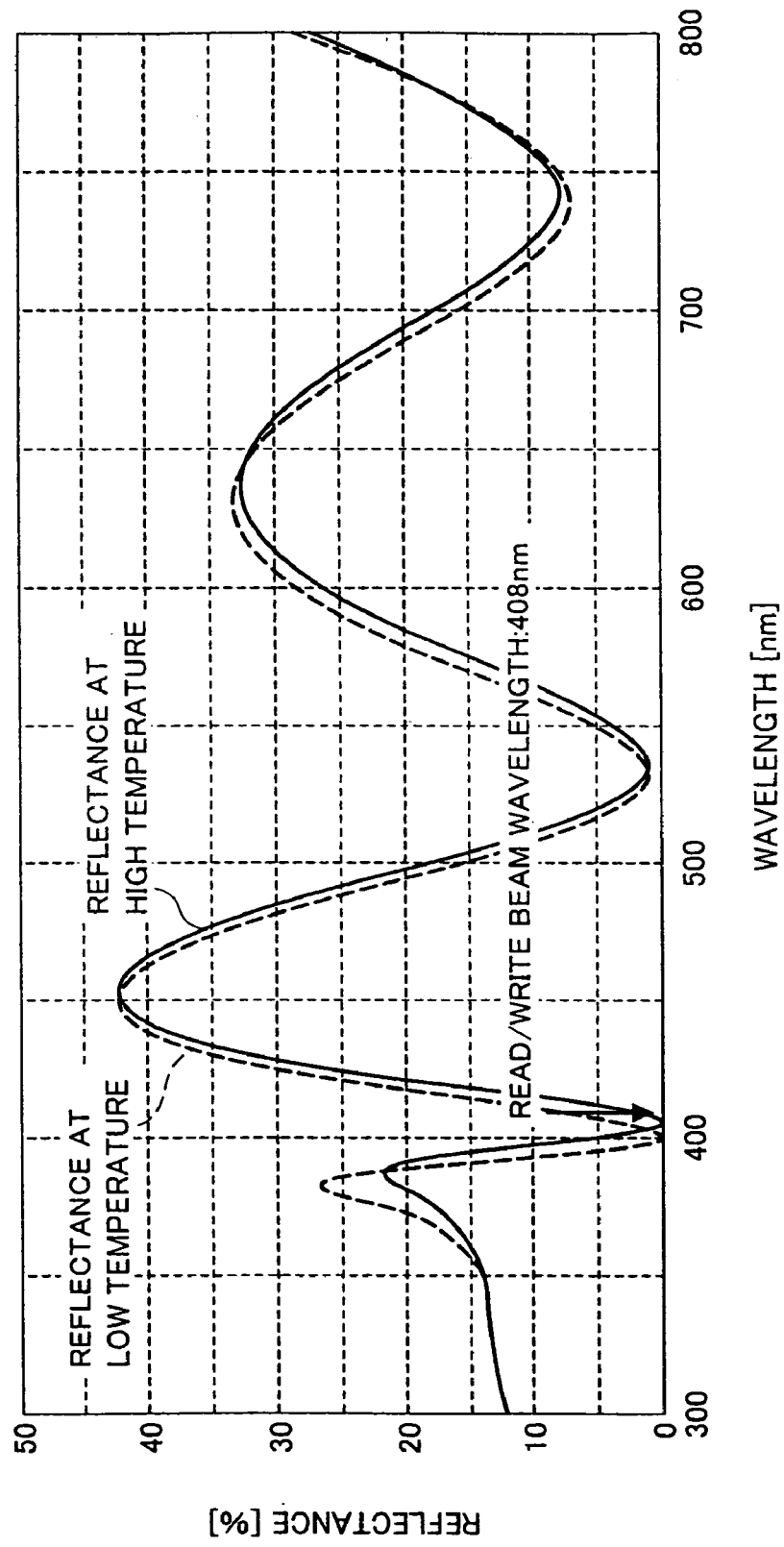
FIG. 18 is a graph showing another example of a change by temperature of spectral transmittance characteristic of the temperature responsive reflection layer including a light absorption layer, and shows a case where the temperature responsive layer has a large thickness, and there exists a minimum value caused by an optical interference effect toward the shorter wavelength with respect to a readout wavelength.
Figure 19:
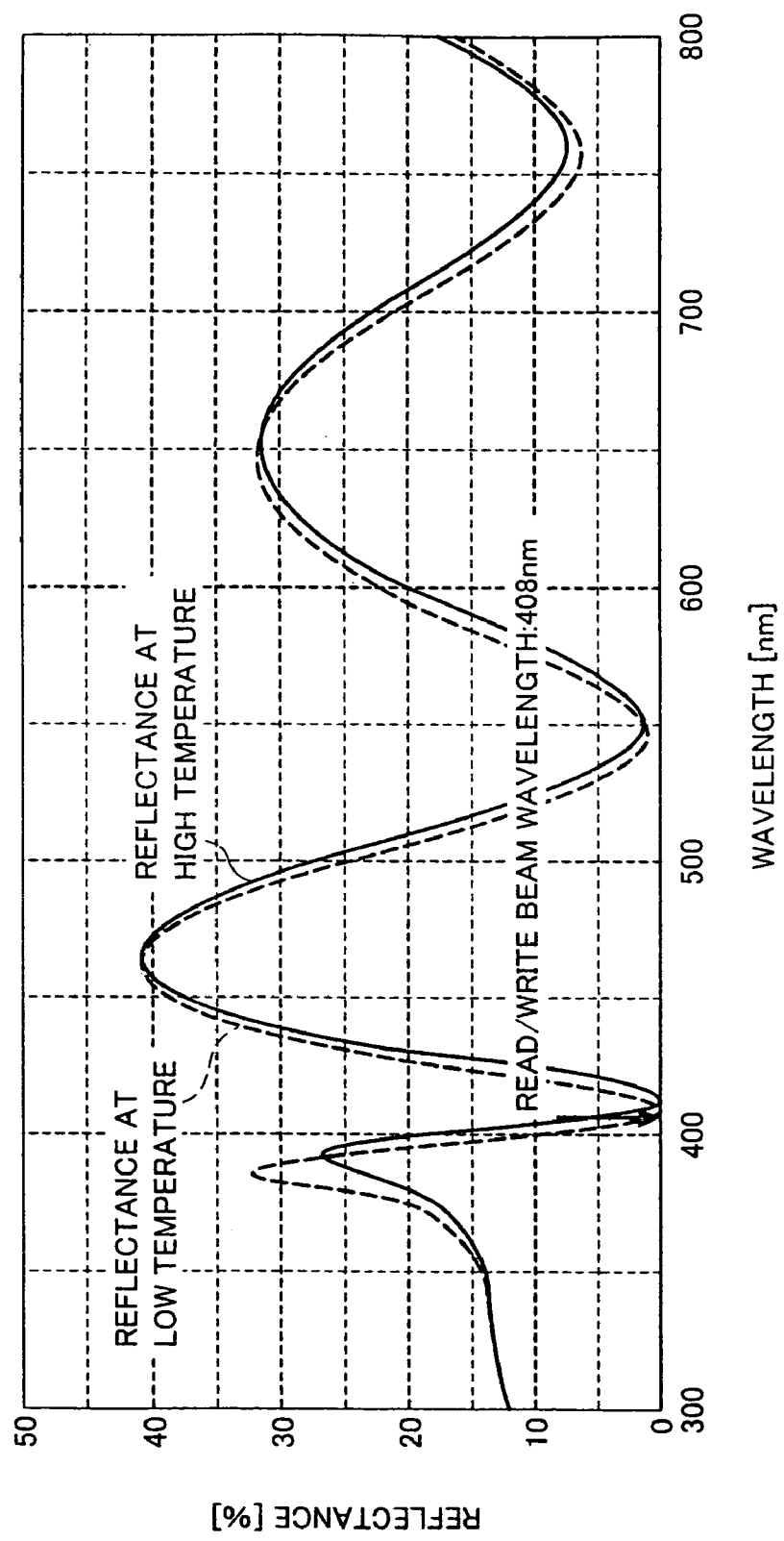
FIG. 19 a graph showing yet another example of a change by temperature of spectral transmittance characteristic of the temperature responsive reflection layer including a light absorption layer, and shows a case where the temperature responsive layer has a large thickness, and there exists a minimum value caused by an optical interference effect to the longer wavelength side with respect to a readout wavelength.

Further, FIG. 18 is a graph showing the spectral reflectance characteristic in a structure using the light absorption layer 22 shown in FIG. 1. FIG. 19 is a graph showing an absorption band shift and an optical interference effect in the optical information recording medium having a ZnO film (230 nm) as the temperature responsive layer 21, a Si film (50 nm) as the light absorption layer 22, and an Al film (30 nm) as the reflection layer 23. As apparent from this graph, the optical information recording medium including the light absorption layer 22 has a lower reflectance, i.e. the quantity of light absorbed more than that of the optical information recording medium not including the light absorption layer 22 (see FIGS. 16 and 17). The optical information recording medium shown in FIG. 18, as with the optical information recording medium shown in FIG. 17, can have a high-temperature mask structure with the low temperature section of a high reflectance and the high temperature section of a low reflectance. The optical information recording medium using the light absorption layer 22 is more likely to increase the temperature of the temperature responsive layer 21. This enables the optical information recording medium to increase in readout power sensitivity. More specifically, upon irradiation of the same quantity of light beam, the optical information recording medium including the light absorption layer 22 increases the temperature of the temperature responsive layer 21 more than the optical information recording medium not including the light absorption layer 22, thus allowing for a higher readout sensitivity of the optical information recording medium.

Figure 26:
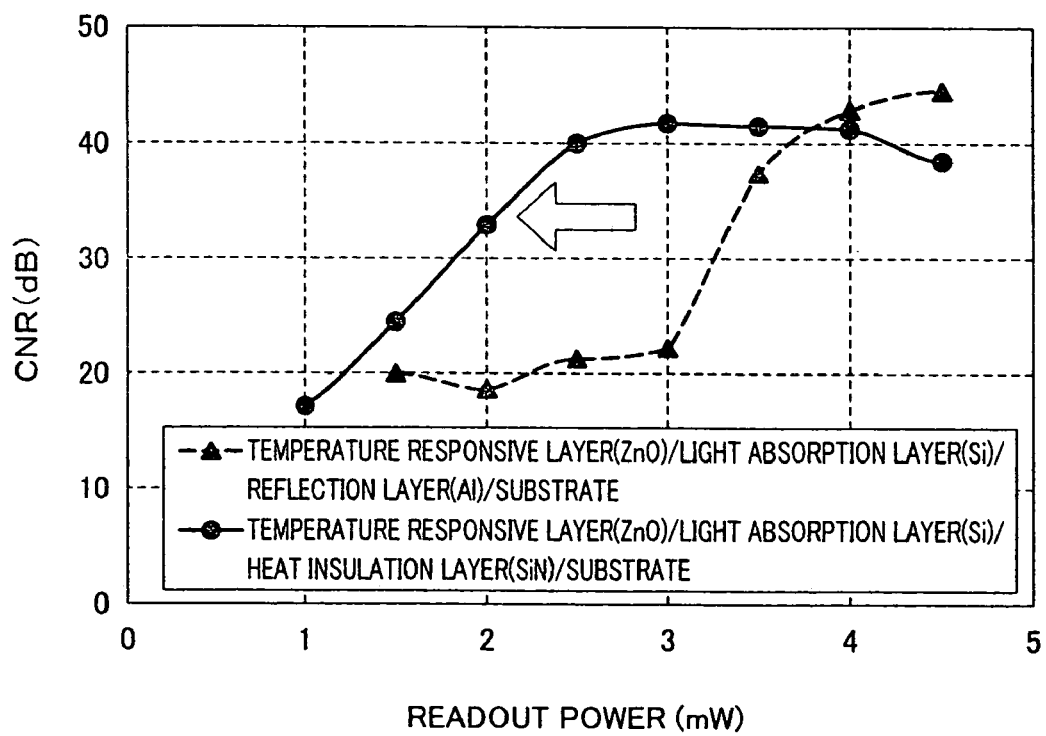
FIG. 26 is a graph showing a CNR-readout power dependence of a recording mark length (0.14 μm) in a super-resolution area of an optical information recording medium including a light absorption layer, a temperature responsive layer, and a reflection layer or a heat insulation layer.
Figure 27:
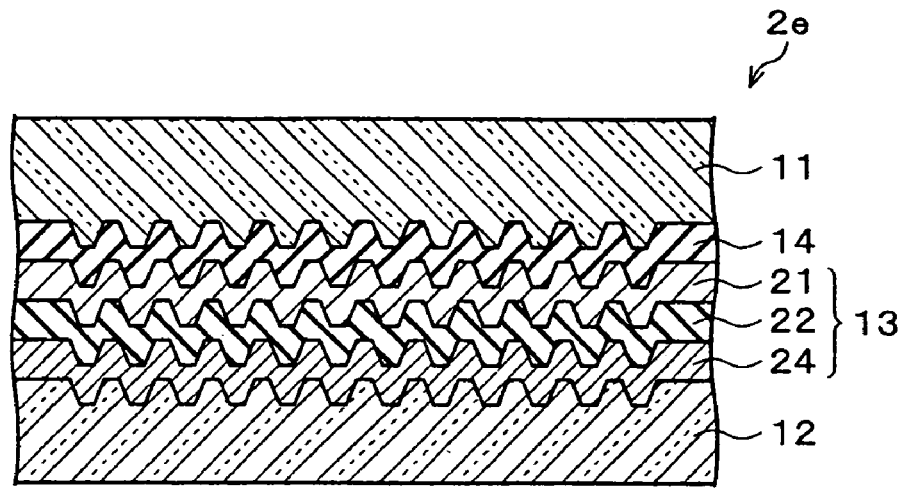
FIG. 27 is a partial cross sectional view illustrating a main portion of an optical information recording medium according to another Embodiment of the present invention.
Figure 28:
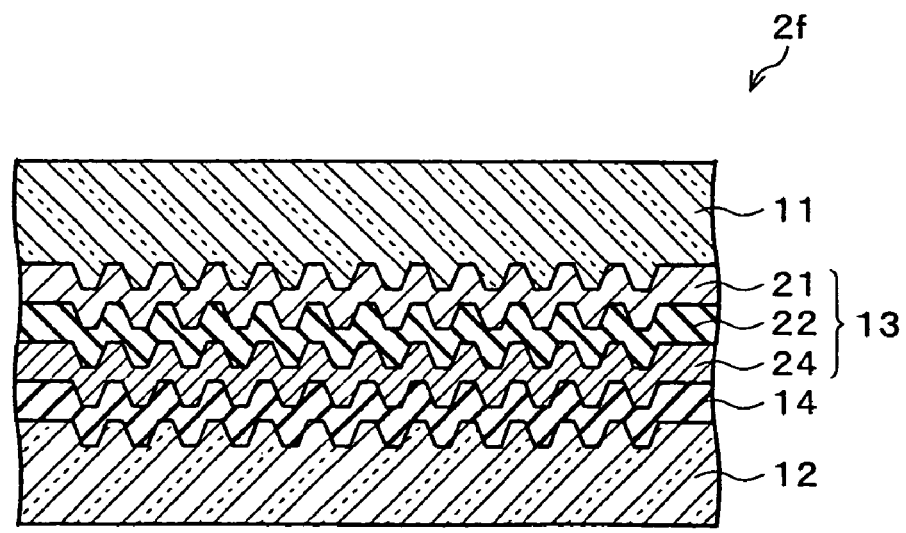
FIG. 28 is a partial cross sectional view illustrating a main portion of an optical information recording medium according to another Embodiment of the present invention.
Figure 29:
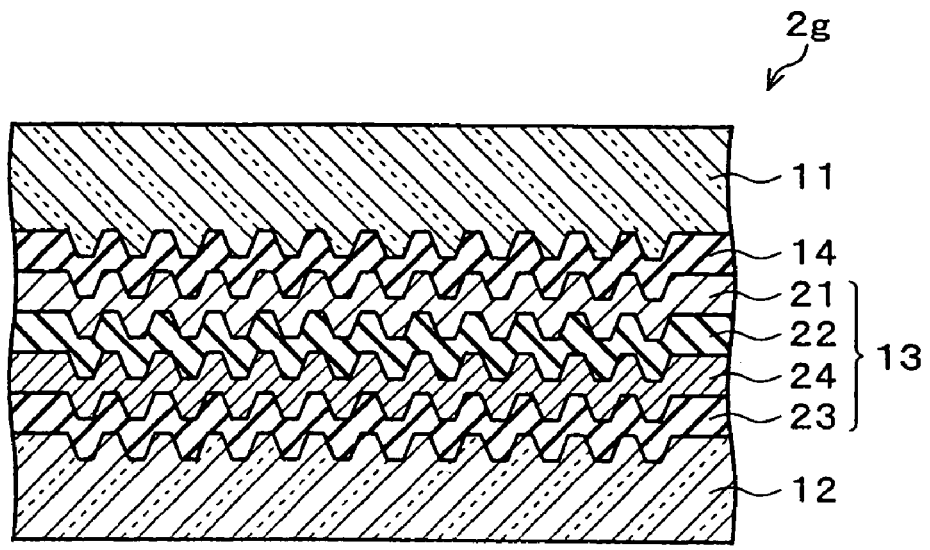
FIG. 29 is a partial cross sectional view illustrating a main portion of an optical information recording medium according to another Embodiment of the present invention.
Figure 30:
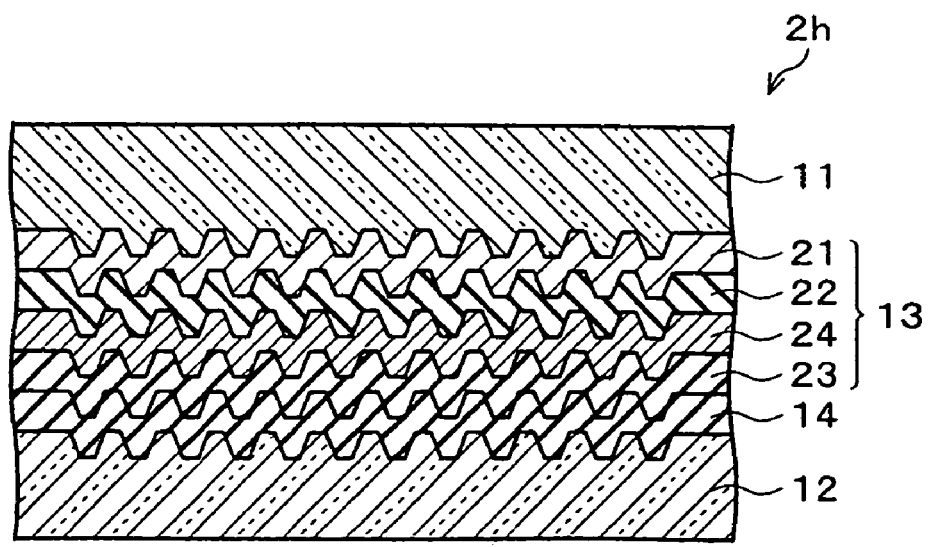
FIG. 30 is a partial cross sectional view illustrating a main portion of an optical information recording medium according to another Embodiment of the present invention.
Figure 31:
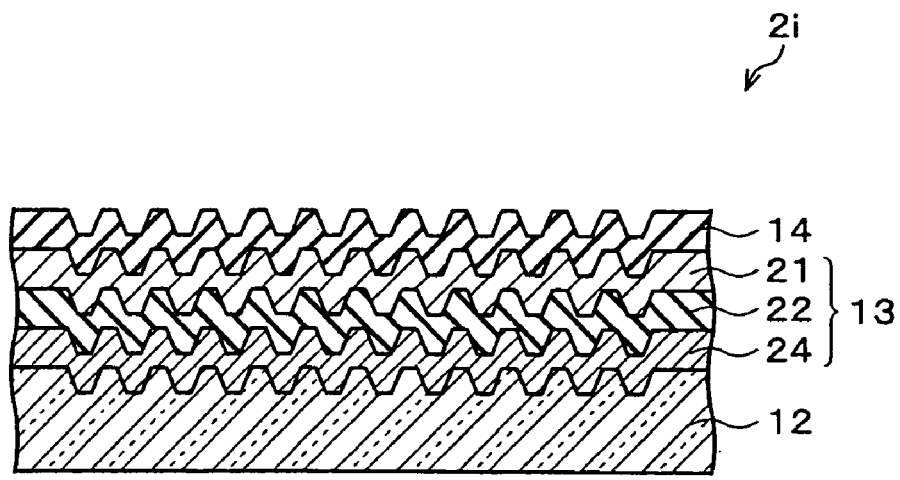
FIG. 31 is a partial cross sectional view illustrating a main portion of an optical information recording medium according to another Embodiment of the present invention.
Figure 32:
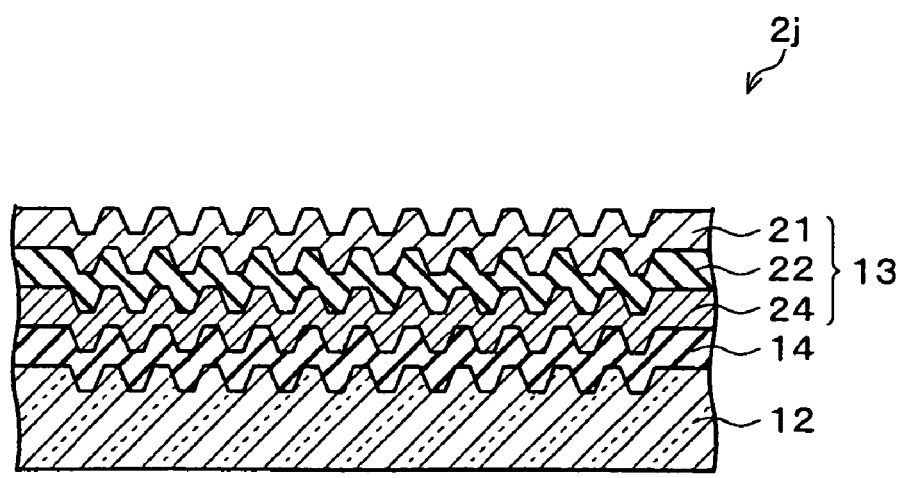
FIG. 32 is a partial cross sectional view illustrating a main portion of an optical information recording medium according to another Embodiment of the present invention.
Figure 33:
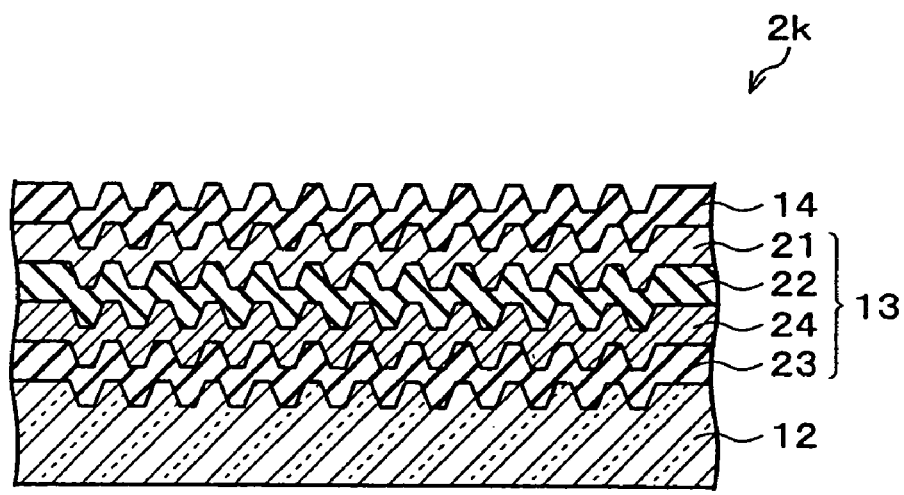
FIG. 33 is a partial cross sectional view illustrating a main portion of an optical information recording medium according to another Embodiment of the present invention.
Figure 34:
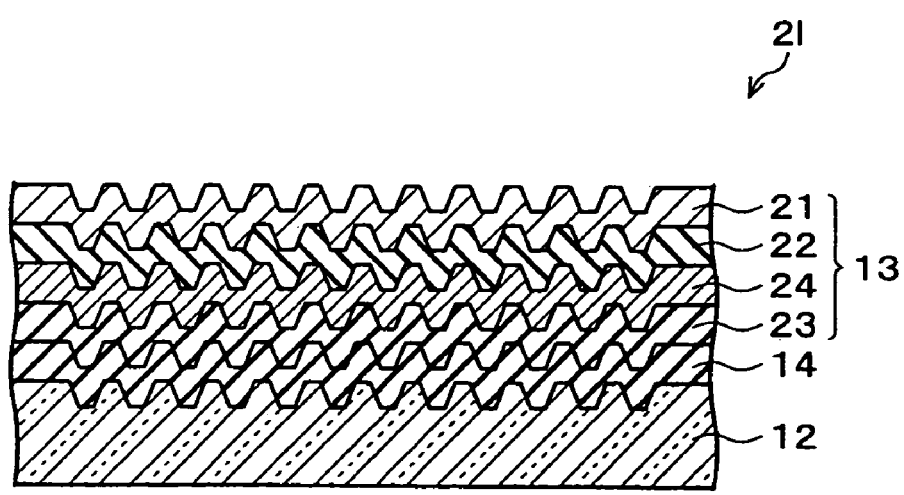
FIG. 34 is a partial cross sectional view illustrating a main portion of an optical information recording medium according to another Embodiment of the present invention.

As shown in FIG. 26, the optical information recording medium using the heat insulation layer 24 (● in FIG. 26) can increase a temperature of the temperature responsive layer 21 more efficiently and realizes a higher readout sensitivity than the optical information recording medium not using the heat insulation layer 24 (▲ in FIG. 26). That is, the presence of the heat insulation layer 24 enables super resolution readout with a lower readout power.

Figure 20:
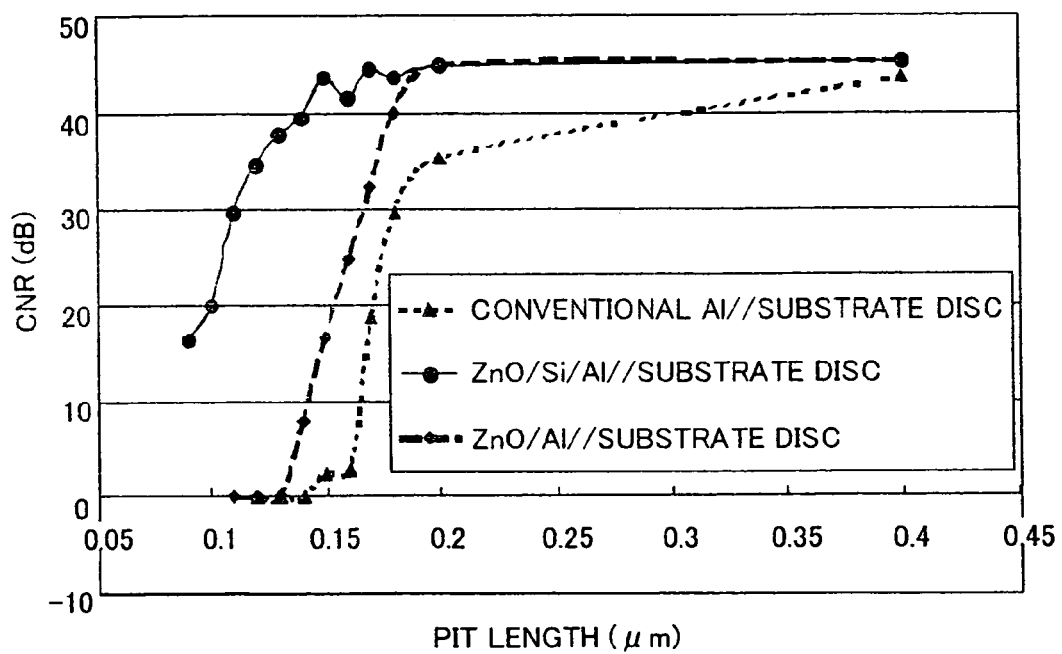
FIG. 20 is a graph showing a comparison in readout resolution signal characteristics (C/N ratio) between an optical information recording medium including a light absorption layer and a temperature responsive layer and an optical information recording medium not including the light absorption layer and the temperature responsive layer.

FIG. 20 is a graph showing recording mark dependence data of a C/N ratio, which is one of the readout signal characteristics, with respect to the optical information recording medium 1a including the light absorption layer 22. As apparent from this graph, increase in thickness of the temperature responsive layer 21 (increase from 210 nm to 230 nm) causes its spectral reflectance characteristic to have a low temperature mask structure where the reflectance increases with increase in temperature, as shown in FIG. 19. In the case of such a film structure, the readout beam spot 34 has the temperature distribution as shown in FIG. 14, and inversely to FIG. 13, the low temperature section 34b has a low reflectance, and the high temperature section 34a has a high reflectance. In this case, the use of light transmitted through the high temperature section 34a enables secure and highly accurate readout of information.

Note that, FIG. 15 shows the spectral reflectance characteristics in the vicinity of the absorption edge of the temperature responsive layer 21 made of a ZnO film having the thickness of 400 nm, under a circumstance of a low temperature (30° C.) and under a circumstance of a high temperature (200° C.). FIG. 16 shows the spectral reflectance characteristics in the vicinity of the absorption edge of the temperature responsive reflection layer 13 made of a ZnO film having the thickness of 100 nm and a Al film having the thickness of 50 nm, under a circumstance of a low temperature (30° C.) and under a circumstance of a high temperature (200° C.). FIG. 17 shows the spectral reflectance characteristics in the vicinity of the absorption edge of the temperature responsive reflection layer 13 made of a ZnO film having the thickness of 400 nm and a Al film having the thickness of 50 nm, under a circumstance of a low temperature (30° C.) and under a circumstance of a high temperature (200° C.). FIG. 18 shows the spectral reflectance characteristics in the vicinity of the absorption edge of the temperature responsive reflection layer 13 made of a ZnO film having the thickness of 210 nm, a Si film having the thickness of 50 nm, and a Al film having the thickness of 30 nm, under a circumstance of a low temperature (30° C.) and under a circumstance of a high temperature (200° C.). FIG. 19 shows the spectral reflectance characteristics in the vicinity of the absorption edge of the temperature responsive reflection layer 13 made of a ZnO film having the thickness of 230 nm, a Si film having the thickness of 50 nm, and a Al film having the thickness of 30 nm, under a circumstance of a low temperature (30° C.) and under a circumstance of a high temperature (200° C.).

Such changes of the wavelength in the absorption edge of the temperature responsive layer 21 are caused by a change of temperature in the width of the forbidden band of a metal oxide semiconductor. The same effect can be caused by other metal oxides than a ZnO, such as a ZnS, $SnO_2$, $CeO_2$, $NiO_2$, $In_2O_3$, $TiO_2$, $Ta_2O_5$, $VO_2$, $SrTiO_3$. Further, a compound semiconductor, such as a GaN, a SiC, a ZnS etc., in which the forbidden band width exists in the vicinity of the wavelength of the readout light beam, can also provide the same effect.

FIG. 26 is a graph showing CNR-readout power dependence between the temperature responsive reflection layer 13 made of a ZnO film having the thickness of 150 nm, a Si film having the thickness of 50 nm, and a Al film having the thickness of 30 nm, and the temperature responsive reflection layer 13 made of a ZnO film having the thickness of 150 nm, a Si film having the thickness of 50 nm, and a SiN film having the thickness of 20 nm. As apparent from this graph, the presence of SiN enables super resolution readout with a lower readout power.

One example of the optical information recording medium 1a according to the present Embodiment will be described below.

In this example of the optical information recording medium 1 according to the present Embodiment, the transparent resin layer 11 has a thickness of approximately 0.1 mm. Further, in this example, the substrate 12 is provided with a concave/convex state by forming pits corresponding to the recorded information on the internal face (the face facing the temperature responsive reflection layer 13). Further, in the present example, the temperature responsive layer 21 is made of a ZnO film having a thickness of approximately 200 nm. Still further, in the present example, the light absorption layer 22 is made of a Si film having a thickness of approximately 50 nm. Yet further, in the present example, the reflection layer 23 is made of an Al film having a thickness of approximately 30 nm.

The optical information recording medium according to the present Embodiment may be manufactured with the following method, for example.

Figure 2:
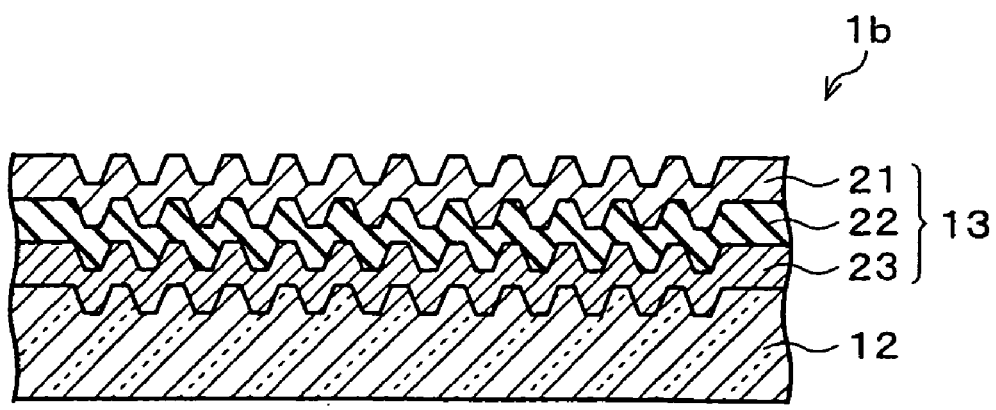
FIG. 2 is a partial cross sectional view illustrating a main portion of an optical information recording medium according to one Embodiment of the present invention.
Figure 3:
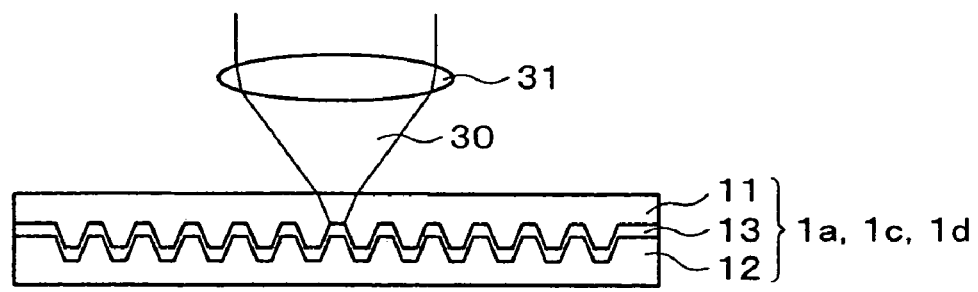
FIG. 3 is a schematic cross-sectional view illustrating an optical information recording medium according to one Embodiment of the present invention.
Figure 4:
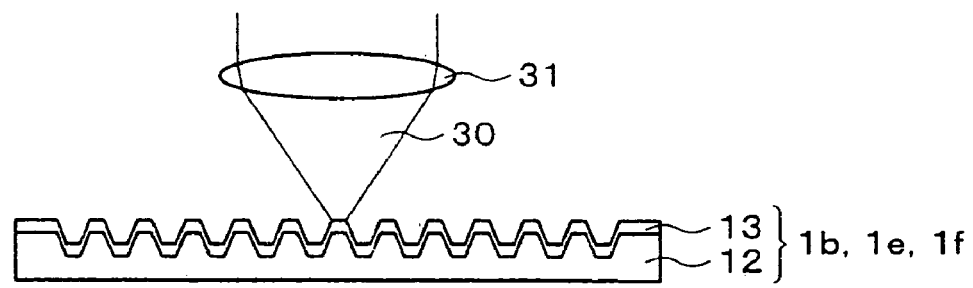
FIG. 4 is a schematic cross-sectional view illustrating an optical information recording medium according to one Embodiment of the present invention.
Figure 5:
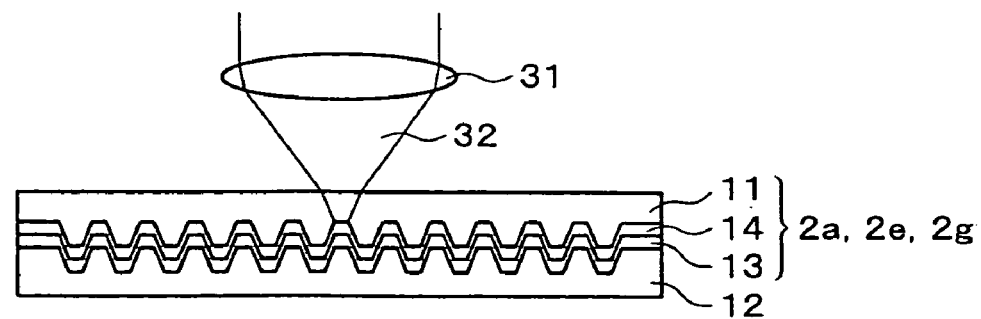
FIG. 5 is a schematic cross-sectional view illustrating an optical information recording medium according to another Embodiment of the present invention.
Figure 6:
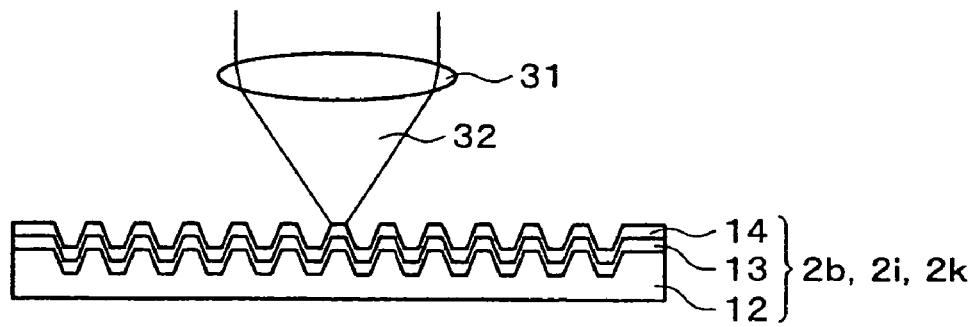
FIG. 6 is a schematic cross-sectional view illustrating an optical information recording medium according to one Embodiment of the present invention.
Figure 7:
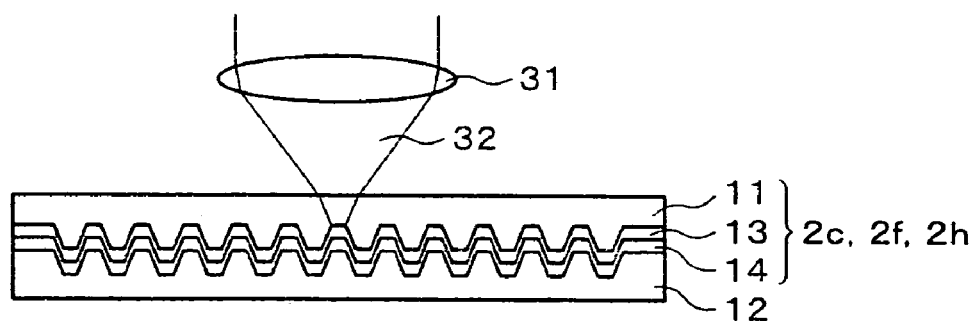
FIG. 7 is a schematic cross-sectional view illustrating an optical information recording medium according to one Embodiment of the present invention.
Figure 8:
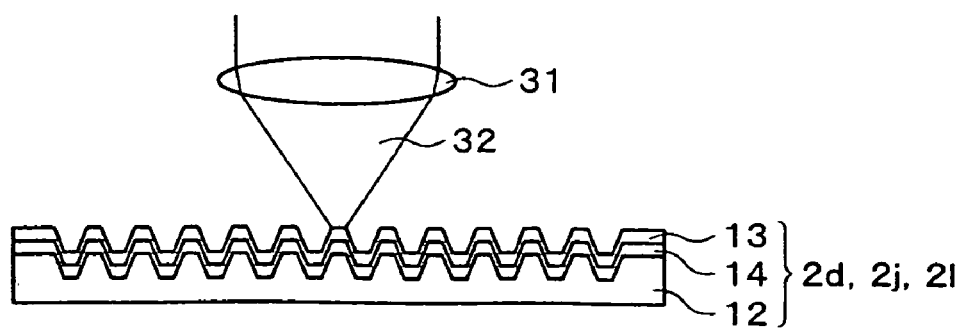
FIG. 8 is a schematic cross-sectional view illustrating an optical information recording medium according to one Embodiment of the present invention.
Figure 9:
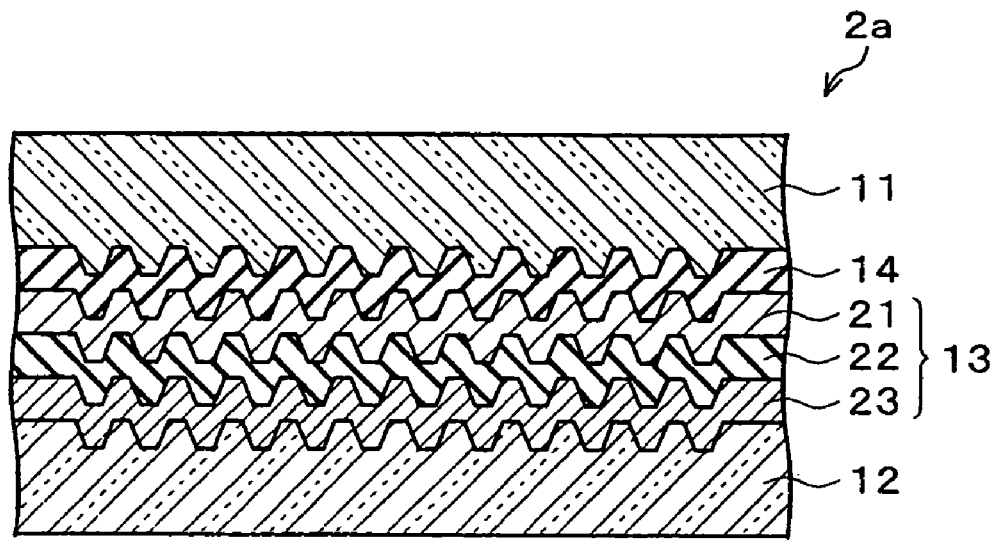
FIG. 9 is a partial cross-sectional view illustrating a main portion of the optical information recording medium shown in FIG. 5.
Figure 10:
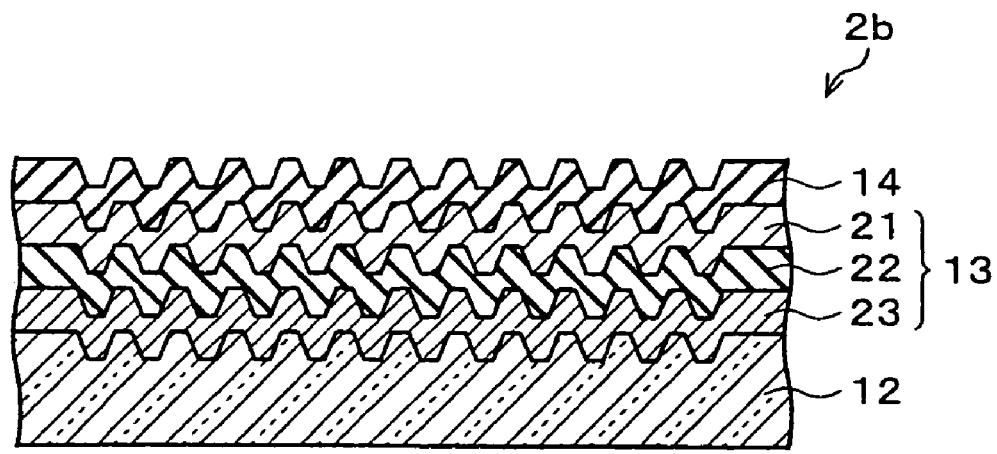
FIG. 10 is a partial cross-sectional view illustrating a main portion of the optical information recording medium shown in FIG. 6.
Figure 11:
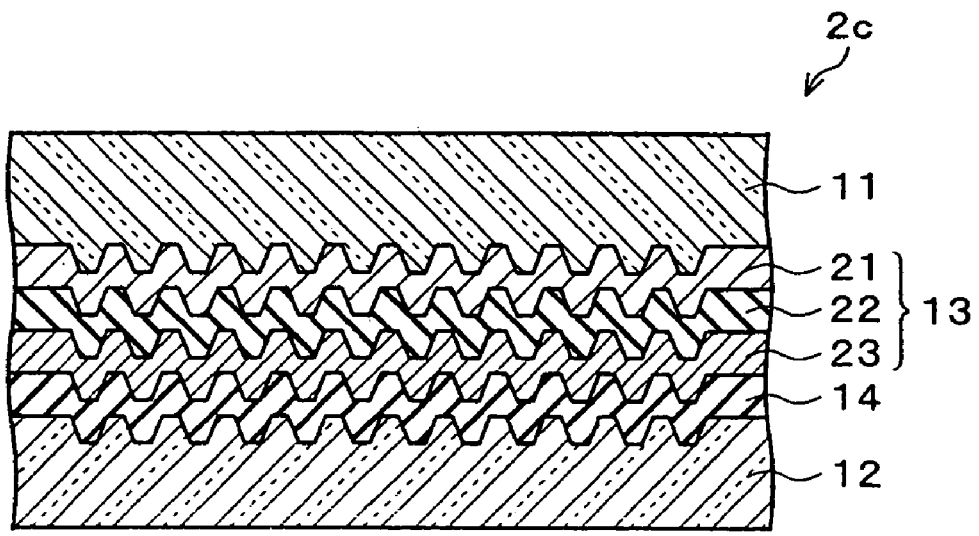
FIG. 11 is a partial cross-sectional view illustrating a main portion of the optical information recording medium shown in FIG. 7.
Figure 12:
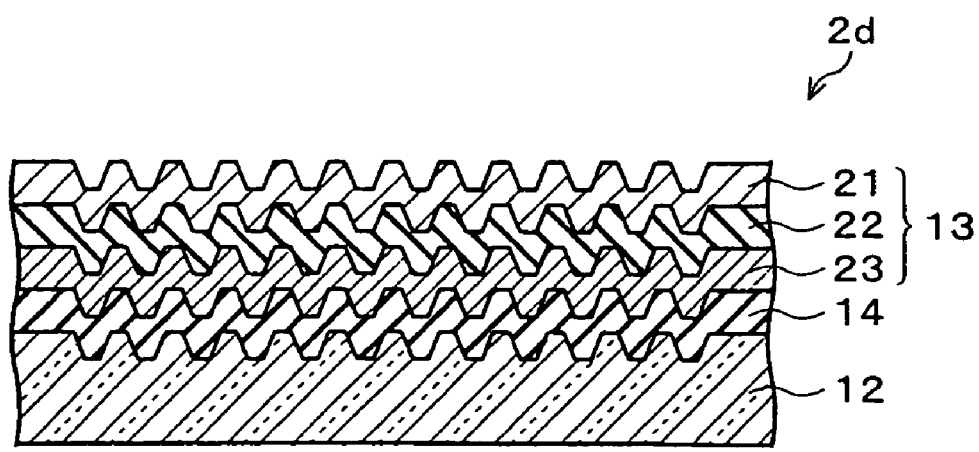
FIG. 12 is a partial cross-sectional view illustrating a main portion of the optical information recording medium shown in FIG. 8.

As shown in FIG. 1, firstly, the temperature responsive reflection layer 13 is made in such a manner that an Al film (metal film) to be the reflection layer 23, a Si film to be the light absorption layer 22, and the temperature responsive layer 21 are deposited in this order by a magnetron sputtering method on the substrate 12, which has a surface (information recording surface) provided with pits and/or grooves corresponding to the recorded information. After the deposition of the temperature responsive layer 21, in order to protect the information recording surface and the temperature responsive reflection layer 13 from external environment, the temperature responsive reflection layer 13 is subjected to spin-coating with an ultraviolet-curing acrylic resin or the like, which becomes a transparent resin layer 11 when cured by ultraviolet irradiation. Further, as shown in FIGS. 2 and 4, since the temperature responsive layer 21 can be formed with a stable oxide, an optical information recording medium can be arranged so as not to include the transparent resin layer 11 (optical information recording medium 1b).

Note that, the explanation above describes the case where the light beam for reproducing information is incident on the optical information recording medium 1 from the side having the transparent resin layer 11; however, the optical information recording medium of the present invention also allow an arrangement of carrying out irradiation of the light beam for reproducing information from the side having the substrate 12, in the same layer structure as that of the optical information recording medium 1a (however, the temperature responsive layer 21 and the reflection layer 23 should be inversely positioned to constitute the temperature responsive reflection layer 13). In this arrangement, however, a protection layer is preferably formed on a surface of the temperature responsive reflection layer 13 opposite to that having the substrate 12.

The substrate 12 in this arrangement is preferably made of a material allowing incident of the readout light beam and also offering an appropriate strength to the optical information recording medium 1. For example, the material may be a glass; a thermoplastic transparent resin such as a polycarbonate, an amorphous polyolefin, a thermoplastic polyimide, a PEN, or a PES; a thermosetting transparent resin such as a thermosetting polyimide or an ultraviolet-curing acrylic resin; or a composition of any of these materials. Typically, an appropriate thickness of the substrate 12 is in a range from 0.3 mm to 1.2 mm.

The protection layer in this arrangement may be made of any materials capable of protecting the temperature responsive reflection layer 13. As a specific example, the materials for the substrate 12 listed above may also be used for the material of the protection layer. Note that, the protection layer may be either a transparent layer or an opaque layer. A general appropriate thickness of the protection layer is in a range from 1 μm to 100 μm.

Further, the optical information recording medium of the present invention is preferably arranged so that only one surface of the substrate 12 is provided with pits and/or grooves; however, the present invention allows an arrangement of providing pits and/or grooves on both surfaces of the substrate 12.

Second Embodiment

Another Embodiment of the present invention will be described below with reference to FIGS. 5 through 12 and FIGS. 27 through 34. For ease of explanation, materials having the equivalent functions as those shown in the drawings pertaining to Embodiment 1 above will be given the same reference symbols, and explanation thereof will be omitted here.

As shown in FIGS. 5, 9, 27, and 29, an optical information recording medium according to the present Embodiment is optical information media 2a, 2e, and 2g for recording and readout (a recordable medium or a rewritable medium), in which a transparent resin layer 11, a recording layer 14, a temperature responsive reflection layer 13, and a substrate 12 are formed in this order from the side receiving a recording/readout beam 32 used for recording and readout. Note that, the recording/readout beam 32 is a light beam which is outputted with a power for recording upon recording and is outputted with a power for readout upon readout.

As with Embodiment 1, the temperature responsive reflection layer 13 includes a temperature responsive layer 21, a light absorption layer 22, a reflection layer 23 and/or a heat insulation layer 24 in this order from the side receiving the recording/readout beam 32 (the side of the transparent resin layer 11). Note that, since the temperature responsive layer 21 as shown in FIGS. 6, 10, 31, and 33 can be formed with a stable oxide, an optical information recording medium can be arranged so as not to include the transparent resin layer 11 (optical information recording media 2b, 2i, and 2k).

Also, as shown in FIGS. 7, 11, 28, and 30, an optical information recording medium according to the present Embodiment can be optical information media 2c, 2f, and 2h for recording and readout (a recordable medium or a rewritable medium), in which the transparent resin layer 11, the temperature responsive reflection layer 13, the recording layer 14, and the substrate 12 are formed in this order from the side receiving a recording/readout beam 32 used for recording and readout. The temperature responsive reflection layer 13 includes the temperature responsive layer 21, the light absorption layer 22, and the reflection layer 23 in this order from the side receiving the recording/readout beam 32 (the side of the transparent resin layer 11). Note that, since the temperature responsive layer 21 as shown in FIGS. 8, 12, 32, and 34 can be formed with a stable oxide, an optical information recording medium can be arranged so as not to include the transparent resin layer 11 (optical information recording media 2d, 2j, and 2l).

The recording layer 14 may be made of a material for recording typically used in the relevant field. For example, an organic dye material such as a cyanine or a phthalocyanine may be used for recordable optical information recording media 2a through 2l. Further, in case of rewritable (recording, readout and deletion type) optical information recording media 2a through 2l, a magnetooptical recording material such as a TbFeCo, or a phase change recording material such as an AgInSbTe, a GeTeSb, or an AgInSb can be used. When the optical information recording media 2a through 2l are constituted of a magnetooptical recording material such as a TbFeCo, the recording layer 14 preferably has a lamination structure made of a dielectric layer made of a dielectric material such as a SiN (Silicon Nitride), a recording layer made of an magnetooptical material, and a protection layer made of a protection material such as a SiN. Further, when the optical information recording media 2a through 2l are constituted of a phase change recording material such as an AgInSbTe, GeTeSb, or an AgInSb, the recording layer 14 preferably has a lamination structure made of a dielectric layer made of a $ZnS-SiO_2$ film, a recording layer made of a phase change material such as an AgInSbTe, GeTeSb, or an AgInSb, and a protection layer made of a $ZnS-SiO_2$ film. The thickness of the recording layer 14 is not limited but a range of 5 nm–500 nm is appropriate.

As with Embodiment 1, the substrate 12 may be either transparent or opaque as long as it offers appropriate strength to the optical information recording media 2a through 2l. As a specific example, the materials for the substrate 12 listed above may be used. The thickness of the substrate 12 is not limited and a range from 0.3 mm to 1.2 mm is appropriate. Note that, in the present Embodiment, the substrate 12 having pits or grooves may instead be a flat substrate.

The transparent resin layer 11 and the temperature responsive reflection layer 13 are the same as those in Embodiment 1, except for the recording layer 14 provided therebetween.

With such a structure, an optical information recording medium including a recording film is realized. This optical information recording medium can be a CD-R (Compact Disc Recordable), a CD-RW (Compact Disc ReWritable), a DVD-R (Digital Versatile Disc Recordable), a DVD-RW (Digital Versatile Disc ReWritable), for example.

Further, the optical information recording media 2a through 2l can be reproduced by the same method as that for the optical information recording media 1a through 1f of Embodiment 1. Namely, the optical information recording media 2a through 2l can be reproduced by using a laser light source (not shown) and an optical system such as a light condensing lens 31, in such a manner that the recording/readout beam 32 is incident on the recording layer 14 from the side of the transparent resin layer 11 or from the side of the temperature responsive layer 21. Here, the irradiation of the recording/readout beam 32 is carried out by providing a high temperature section and a low temperature section in the light beam spot of the temperature responsive layer 21, so as to change transmittance in the high temperature section of the temperature responsive layer 21. Then, an optical head (not shown) detects the reflection light of the recording layer 14, so as to reproduce information based on the light transmitted through the low temperature section of the temperature responsive layer 21.

The optical information recording media 2a, 2b, 2e, 2g, 2i, and 2k include the temperature responsive reflection layer 13 on the rear surface (the surface opposite to that irradiated with the recording/readout beam 32) of the recording layer 14, i.e., the surface not irradiated with a light beam, and therefore, when the recording/readout beam 32 is guided to a guiding groove of the transparent substrate upon readout, the recording/readout beam 32 is incident on the temperature responsive layer 13 via the recording layer 14. The incident of the recording/readout beam 32 raises the temperature of the temperature responsive reflection layer 13 so that the later half of the readout beam spot has a high temperature, while the remaining portion has a low temperature. Further, the light absorption layer 22 causes this high temperature section to have a higher temperature. Since the temperature responsive reflection layer 13 has a characteristic for causing a change of reflectance with a rise in temperature, the high temperature section has a low reflectance and the low temperature section has a high reflectance. On this account, the information recorded on the recording layer 14 may be reproduced with a small opening (low temperature section) less than the optical spatial resolution (the diffraction limit of the readout light beam). Thus, it is possible to realize high quality readout of information recorded with high density. With such a manner, the optical information recording medium according to the present Embodiment uses the temperature responsive layer 21 and the light absorption layer 22 to be capable of reproducing a minute recording mark less than the diffraction-limit of the readout light beam, which is provided on the recording layer 14.

Further, the optical information recording media 2a, 2b, 2e, 2g, 2i, and 2k according to the present Embodiment, in which the temperature responsive layer 21 is provided on the rear surface of the recording layer 14, i.e., the surface not receiving the incident light, is more advantageous in the following regards than the arrangements disclosed in the Japanese Laid-Open Patent Application Nos. 5-12673/1993 and 5-12715/1993 in which a mask layer is provided on the light incident surface of the recording layer. That is, it is possible to more easily raise the temperature of the temperature responsive layer 21 by using optical interference effect with the temperature responsive layer 21 provided on the rear surface of the recording layer 14. Consequently, readout may be carried out with lower laser power, thus realizing an optical information recording medium offering high readout sensitivity.

Further, as with Embodiment 1, the optical information recording media 2a through 2l according to the present Embodiment include the temperature responsive layer 21 in which the transmittance decreases in the high temperature section 33a, and therefore the temperature responsive layer 20 can be made of a metal oxide or the like, which is not dissolved by a rise in temperature upon recording or readout. On this account, the temperature responsive layer 21 can maintain the mask effect even when recording or readout is repeatedly performed, thus offering superior durability.

The arrangement of the optical information recording media 2a, 2b, 2e, 2g, 2i, and 2k, in which the temperature responsive layer 21 is provided on the rear surface of the recording layer 14, i.e., the surface not receiving the recording/readout beam 32, is more advantageous in the following regards than the arrangements disclosed in the Japanese Laid-Open Patent Application Nos. 5-12673/1993 and 5-12715/1993 in which a mask layer is provided on the side receiving the incident light. That is, in the optical information recording medium having a recording film provided on the substrate in Japanese Laid-Open Patent Application Nos. 5-12673/1993 and 5-12715/1993, the mask layer is provided on the light irradiation surface of the recording layer, and therefore, the mask layer absorbs at least a certain part of the whole quantity of light entering to the recording layer. This may cause such as a decrease of recording sensitivity or an increase of readout noise and degrades signal quality. On the contrary, it is possible to more easily raise the temperature of the temperature responsive layer 21 by using optical interference effect with the temperature responsive layer 21 provided on the rear surface of the recording layer 14. Consequently, readout may be carried out with a lower laser power, thus realizing an optical information recording medium offering high readout sensitivity.

The method for performing recording of the optical information recording medium 2 is not limited, but one preferable example can be such a manner that upon irradiation of the recording/readout beam 32, the optical information recording media 2c, 2d 2f, 2h, 2j, and 2l have a high temperature section and a low temperature section in the temperature responsive reflection layer 13, and for example, when the transmittance decreases in the high temperature section, a minute area of the recording layer 14 is selectively heated with the light transmitted through the low temperature section of the temperature responsive layer 21. In this manner, it is possible to record information in the minute area of the recording layer 14, thus realizing high density recording. Further, upon irradiation of the recording/readout beam 32, the optical information recording media 2a, 2b 2e, 2g, 2i, and 2k have a high temperature section and a low temperature section in the recording layer 14, and a minute area of the recording layer 14 is selectively heated. In this manner, it is possible to record information in the minute area of the recording layer 14, thus realizing high density recording.

In the respective Embodiments described above, the transmittance of the temperature responsive layer 21 with respect to the wavelength of a readout light beam decreases with a rise in temperature. However, the transmittance of the temperature responsive layer 21 does not necessarily decrease with a rise in temperature even when the temperature responsive layer 21 has the transmittance characteristics shown in FIGS. 15 through 17, depending on the setting of the wavelength of a readout light beam. More specifically, in the temperature responsive layer 21 with the transmittance characteristics shown in FIGS. 15 through 17, the transmittance decreases at a high temperature with respect to a wavelength of 405 nm, but may increase at high temperature with respect to a wavelength of longer than 405 nm. Therefore, it is also effective for the case of setting a wavelength to cause an increase of the transmittance at a high temperature. In other words, the present invention allows a use of the temperature responsive layer 21 whose transmittance for the readout light beam increases with a rise in temperature.

The optical information recording medium 1 or 2, in which the transmittance for a readout light beam of the temperature responsive layer 21 increases with a rise in temperature, can be reproduced by such a method that the light beam irradiation is carried out by providing a high temperature section and a low temperature section in the light beam spot of the temperature responsive layer 21, so as to increase transmittance of the temperature responsive layer 21 in the high temperature section, and an optical head (not shown) detects the reflection light of the recording layer 14, so as to reproduce information with the light transmitted through the high temperature section of the temperature responsive layer 21.

Further, FIGS. 18 and 19 show spectral reflection spectrums in a structure in which the light absorption layer 22 is added to the rear surface of the temperature responsive layer 21 (on the side having the substrate 12). With this structure, it is possible to increase an achieved temperature of the temperature responsive layer 21 with a lower laser power, thus realizing a super resolution readout medium with high readout sensitivity. Also, this structure can be designed for both a high temperature mask type (FIG. 18) in which the reflectance decreases with a rise in temperature and a low temperature mask type (FIG. 19) in which the reflectance increases with a rise in temperature.

FIG. 20 shows comparison in readout resolution characteristics among such an optical information recording medium including the temperature responsive layer 21, the light absorption layer 22, and the reflection layer 23 (including the temperature responsive reflection layer 13) (● in FIG. 20), an optical information recording medium including only the temperature responsive layer 21 and the reflection layer 23 (not including the light absorption layer 22) (♦ in FIG. 20), and an optical information recording medium including only the reflection layer 23 (▲ in FIG. 20). According to this graph, temperature responsive-type super resolution media (♦ and ▲ in FIG. 20) are capable of readout beyond an optical resolution limit (0.17 μm). The optical information recording medium including the temperature responsive layer 21, the light absorption layer 22, and the reflection layer 23 (● in FIG. 20), has an excellent readout sensitivity, causing further improvement of the resolution limit which enables obtaining of the readout signal down to 0.09 mm. Note that, a readout parameter of an evaluation optical system is a wavelength of 408 nm and NA (Numerical Aperture) of the objective lens of 0.65.

Further, the optical information recording media 2a, 2b, 2e, 2g, 2i, and 2k above include the temperature responsive layer 21 on the surface opposite to that irradiated with the light beam; however, the present invention allows an arrangement in which the temperature responsive layer 21 is provided on the surface irradiated with the recording/readout beam 32, in the recording layer 14 (optical information recording media 2c, 2d, 2f, 2h, 2j, and 2l). The optical information recording medium having this arrangement is insufficient in terms of readout sensitivity compared to the optical information recording media 2a, 2b, 2e, 2g, 2i, and 2k; however, it ensures superior durability than the arrangement disclosed in Japanese Laid-Open Patent Application Nos. 5-12673/1993 and 5-12715/1993.

Further, an optical information recording medium of the present invention may be such that the optical information recording media 2a through 2l further include the recording layer 14 on the side of the temperature responsive reflection layer 13 on which the light beam is incident, i.e., between the substrate 12 and the temperature responsive reflection layer 13.

Note that, the present invention is not limited to those Embodiments described above but may be applied in many variations within the scope of the patent claims set forth below. For example, the optical information recording medium of the present invention is not necessarily in the form of a disk, i.e., a circular optical disk but may be in the form of a card or a sheet, for example. Further, the optical information recording medium according to the present invention does not limit the method for optically performing recording and readout, and the optical information recording medium of the present invention may be a different type of optical information recording medium, such as an megnetooptical disk, a phase-change-type optical disk or other various media.

Further, the optical information recording medium of the present invention may have a lamination structure made up of plural layers of either of the layer structure of the First Embodiment and the layer structure of the Second Embodiment. Such a lamination structure may be made of two substrates respectively provided with the temperature responsive reflection layer 13, or both the temperature responsive reflection layer 13 and the recording layer 14. The two substrates are then bonded together in a state where the respective temperature responsive reflection layers 13 and the respective recording layers 14 are opposite to each other, so as to accept light irradiation from both surfaces.

Further, the technical range of the present invention also includes a combination of the different technical means disclosed in the respective Embodiments above. For example, the optical information recording medium of the present invention may have a hybrid structure including a readout-only face based on the layer structure of First Embodiment, and a recording/readout face based on the layer structure of Second Embodiment.

Figure 21:
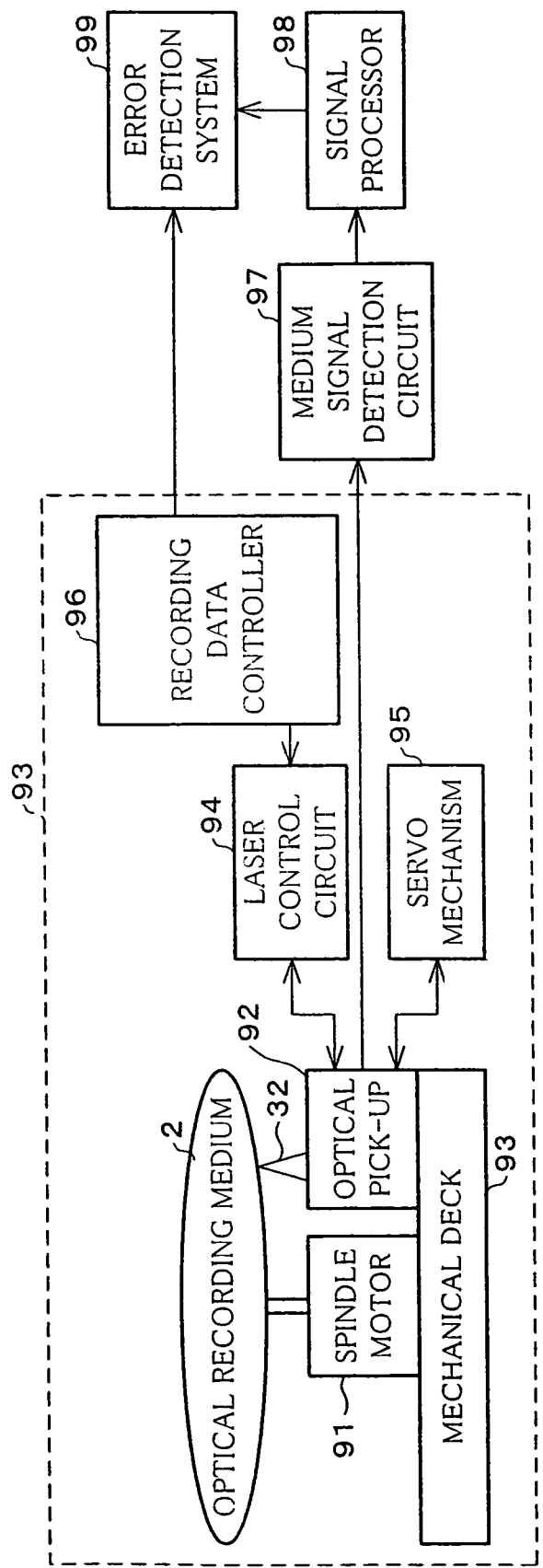
FIG. 21 is a block diagram illustrating an arrangement of one Embodiment of an optical information recording and readout device according to the present invention.
Figure 22:
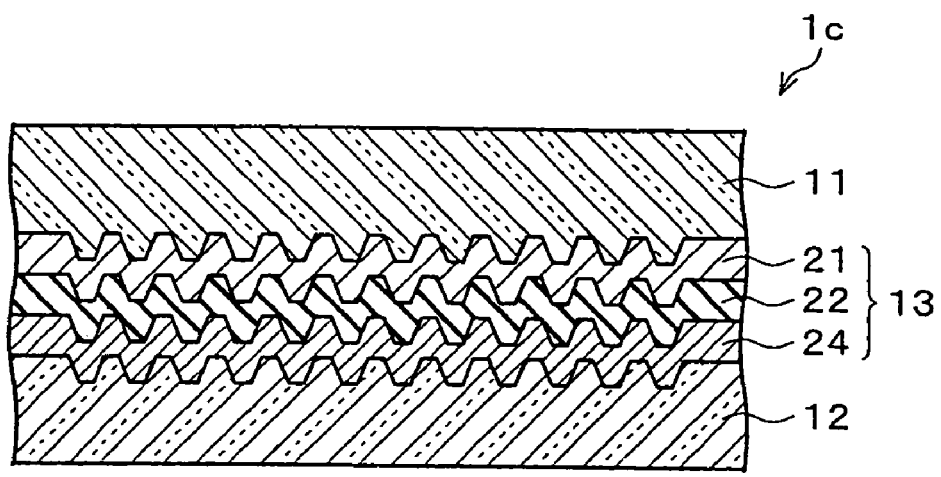
FIG. 22 is a partial cross sectional view illustrating a main portion of an optical information recording medium according to one Embodiment of the present invention.
Figure 23:
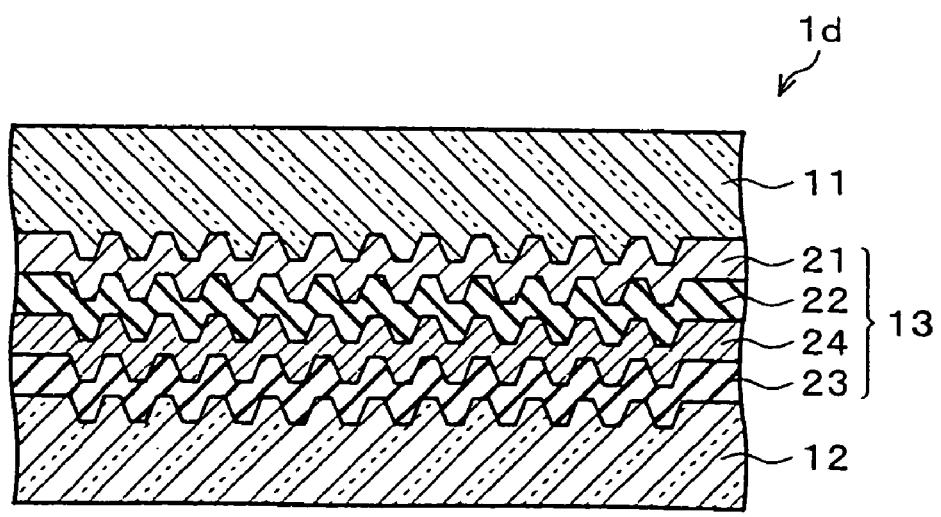
FIG. 23 is a partial cross sectional view illustrating a main portion of an optical information recording medium according to one Embodiment of the present invention.
Figure 24:
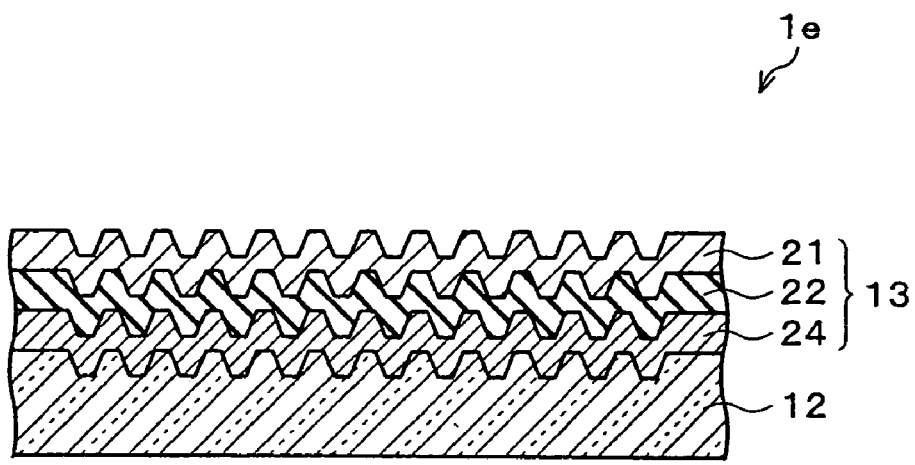
FIG. 24 is a partial cross sectional view illustrating a main portion of an optical information recording medium according to one Embodiment of the present invention.
Figure 25:
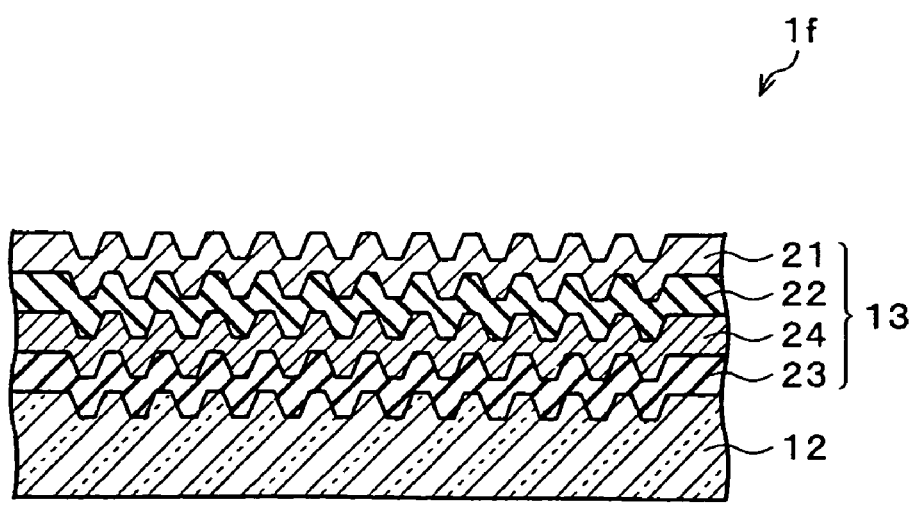
FIG. 25 is a partial cross sectional view illustrating a main portion of an optical information recording medium according to one Embodiment of the present invention.

Further, FIG. 21 shows an optical information recording and readout device (optical information readout device, optical information recording device) which may be used for performing recording and readout of the optical information recording medium according to the present Embodiment. FIG. 21 is a block diagram showing an arrangement of one Embodiment of the optical information recording and readout device according to the present invention.

As shown in FIG. 21, the optical information recording and readout device includes a spindle motor 91 for rotating the optical information recording medium 2, an optical pickup (optical irradiator, optical detector) 92 for emitting the recording/readout light beam 32 and detecting the reflection light of the recording layer 14, a mechanical deck 93 for supporting the spindle motor 91 and the optical pickup 92, a laser control circuit 94 for controlling laser power of the optical pickup 92, a servomechanism 95 for changing the position of the mechanical deck 93 according to an output of the optical pickup 92, a recording data control section 96 for controlling the laser control circuit 94 according to an information signal corresponding to the target information for recording, so as to control laser power of the optical pickup 92, a medium signal detection circuit 97 for detecting a information signal from the reflection light detected by the optical pickup 92, a signal processing circuit 98 for processing the information signal detected by the medium signal detection circuit 97, an error detection system 99 for detecting error of the information signal.

The optical pickup 92 emits the recording/readout beam 32 (laser beam) with respect to the recording layer 14 from the side of the transparent resin layer 11, by using a laser light source (not shown) and an optical system such as a light condensing lens 31. Further, the optical pickup 92 carries out the irradiation of the recording/readout beam 32 with respect to the optical information recording medium 2, by providing a high temperature portion and a low temperature portion in the light beam spot of the temperature responsive layer 21, so as to decrease transmittance of the temperature responsive layer 21 in the high temperature portion. Then, the optical pickup 92 detects the reflection light of the recording layer 14 with an optical head (not shown).

In the foregoing optical information recording and readout device, the laser control circuit 94 controls the laser power of the optical pickup 92 so that the optical information recording medium 2 is irradiated with a high-power laser beam for recording or deletion, and with a low-power laser beam for readout.

In the respective Embodiment described above, the transmittance of the temperature responsive layer 21 with respect to the wavelength of a readout light beam decreases with a rise in temperature. However, the transmittance of the temperature responsive layer 21 does not necessarily decrease with a rise in temperature even when the temperature responsive layer 21 has the transmittance characteristics shown in FIGS. 15 through 17, depending on the setting of the wavelength of a readout light beam. More specifically, in the temperature responsive layer 21 with the transmittance characteristics shown in FIGS. 15 through 17, the transmittance decreases with respect to a wavelength of 405 nm, but may increase with a rise in temperature with respect to a wavelength of longer than 405 nm. The present invention is also effective for the case of setting a wavelength to cause an increase of the transmittance at a high temperature. In other words, the present invention allows a use of the temperature responsive layer 21 whose transmittance for the readout light beam increases with a rise in temperature.

The optical information recording media $1a$ through $1f$ and $2a$ through $2l$, in which the transmittance for a readout light beam of the temperature responsive layer 21 increases with a rise in temperature, can be reproduced by such a method that the light beam irradiation is carried out by providing a high temperature section and a low temperature section in the light beam spot of the temperature responsive layer 21, so as to increase transmittance of the temperature responsive layer 21 in the high temperature section, and an optical head (not shown) detects the reflection light of the recording layer 14, so as to reproduce information with the light transmitted through the high temperature section of the temperature responsive layer 21.

Further, recording of the optical information recording media $2a$ through $2l$, in which the transmittance for a readout light beam of the temperature responsive layer 21 increases with a rise in temperature, can be performed by such a method that the light beam irradiation is carried out by providing a high temperature section and a low temperature section in the light beam spot of the temperature responsive layer 21, so as to increase transmittance in the high temperature section of the temperature responsive layer 21, and an optical head (not shown) detects the reflection light of the recording layer 14, so as to selectively heat a minute area of the recording layer 14 with the light transmitted through the high temperature section of the temperature responsive layer 21.

Further, the optical information recording media $2a$ through $2l$ above include the temperature responsive layer 21 on the surface opposite to that irradiated with the light beam; however, the present invention allows an arrangement in which the temperature responsive layer 21 is provided on the surface irradiated with the recording/readout beam 32, in the recording layer. The optical information recording medium having this arrangement is insufficient in terms of readout sensitivity compared to the optical information recording medium 2; however, it ensures superior durability than the arrangement disclosed in Japanese Laid-Open Patent Application Nos. 5-12673/1993 and 5-12715/1993.

Further, the optical information recording media $2a$ through $2l$ of the present invention may further include the recording layer 14 on the side of the temperature responsive reflection layer 13 on which the light beam is incident, i.e., between the substrate 23 and the temperature responsive reflection layer 13.

Note that, the present invention is not limited to those Embodiments described above but may be applied in many variations within the scope of the patent claims set forth below. For example, the optical information recording medium of the present invention is not necessarily in the form of a disk, i.e., a circular optical disk but may be in the form of a card or a sheet, for example. Further, the optical information recording medium according to the present invention does not limit the method for optically performing recording and readout, and the optical information recording medium of the present invention may be a different type of optical information recording medium, such as an magnetooptical disk, a phase-change-type optical disk or other various media.

Further, the optical information recording medium of the present invention may have a lamination structure made up of plural layers of either of the layer structure of the First Embodiment and the layer structure of the Second Embodiment. Such a lamination structure may be made of two substrates respectively provided with the temperature responsive reflection layer 13, or both the temperature responsive reflection layer 13 and the recording layer 14. The two substrates are then bonded together in a state where the respective temperature responsive reflection layers 13 and the respective recording layers 14 are opposite to each other, so as to accept light irradiation from both surfaces.

Further, the technical range of the present invention also includes a combination of the different technical means disclosed in the respective Embodiments above. For example, the optical information recording medium of the present invention may have a hybrid structure including a readout-only face based on the layer structure of First Embodiment, and a recording/readout face based on the layer structure of Second Embodiment.

As described above, an optical information recording medium according to the present invention storing information which can be reproduced by irradiation of a light beam, includes: a temperature responsive layer whose reflectance and/or transmittance changes with a change in temperature caused by the irradiation of a light beam; and a light absorption layer which changes a temperature of the temperature responsive layer.

With the foregoing arrangement, upon irradiation of a readout light beam, the transmittance of the temperature responsive layer changes, more specifically, decreases or increases, in a portion where the temperature rises from the light irradiation, but does not change in the remaining portion where the temperature does not rise and kept low. Moreover, the temperature of the temperature responsive layer is changed by the light absorption layer as well as by irradiation of a light beam. For example, in the case where the light absorption layer is a material which exchanges light into heat, the light absorption layer absorbs a readout light beam to exchange it into heat. The heat exchanged by the light absorption layer transfers to the temperature responsive layer. This results in a further temperature increase in the temperature responsive layer in a portion where the temperature increases by the irradiation of a light beam. Therefore, the transmittance of the portion further decreases or increases.

This enables readout of information with light transmitted through the high temperature section or the low temperature section in the temperature responsive layer. As a result, it is possible to selectively carry out readout in an area smaller than the spot size of a readout light beam. Further, since the light absorption layer facilitates a change in temperature of the temperature responsive layer, it is possible to provide an optical information recording medium enabling secure and highly accurate readout of information upon irradiation of a light beam with the same power as that of the conventional light beam, compared to an optical information recording medium not having a light absorption layer. Therefore, while a conventional method not using a temperature responsive layer and a light absorption layer fails to read out a pit or the like smaller than the readout spot size of the optical system, the present invention enables readout of such a small pit or the like with high signal strength.

The foregoing optical information recording medium which uses irradiation of a light beam for reproducing recorded information can be a CD-ROM for example, which operates as a readout-only memory (readout-only ROM) by having a surface previously formed in a concave-convex state by providing pits thereon. As a typical structure for such a CD-ROM, an optical information recording medium which uses irradiation of a light beam for optically reproducing the information by having a concave and convex substrate provided with pits or grooves corresponding to the recorded information is further provided with a temperature responsive layer whose transmittance for irradiation of a light beam changes with an increase in temperature. Note that, there will be some difficulties to realize the foregoing optical information recording medium without providing the concave and convex substrate provided with pits or grooves; however, a possible alternative may be a structure previously provided with the guiding grooves or pits with a laser before carrying out recording or readout of information, as with a magnetic disk. Such structure has however never been enforced before.

Further, as described above, an optical information recording medium according to the present invention for storing information by irradiation of a light beam and for allowing readout of the information by irradiation of a light beam, includes: a temperature responsive layer whose reflectance and/or transmittance changes with a change in temperature caused by the irradiation of a light beam; and a light absorption layer which changes a temperature of the temperature responsive layer.

With the foregoing arrangement, upon irradiation of a recording light beam, the transmittance of the temperature responsive layer changes, more specifically, decreases or increases, in a portion where the temperature rises from the light irradiation, but does not change in the remaining portion where the temperature does not rise and kept low. Moreover, the temperature of the temperature responsive layer is changed by the light absorption layer as well as by irradiation of a light beam. For example, in the case where the light absorption layer is a material which exchanges light into heat, the light absorption layer absorbs a readout light beam to exchange it into heat. The heat exchanged by the light absorption layer transfers to the temperature responsive layer. This results in a further temperature increase in the temperature responsive layer in a portion where the temperature increases by the irradiation of a light beam. Therefore, the transmittance of the portion further decreases or increases.

This enables recording of information with light transmitted through the high temperature section or the low temperature section in the temperature responsive layer. It is possible to selectively carry out recording in an area smaller than the spot size of a recording light beam. Further, since the light absorption layer facilitates a change in temperature of the temperature responsive layer, it is possible to provide an optical information recording medium enabling secure and highly accurate recording of information upon irradiation of a light beam with the same power as that of the conventional light beam, compared to an optical information recording medium not having a light absorption layer. Therefore, while a conventional method not using a temperature responsive layer and a light absorption layer fails to read out a mark smaller than the readout spot size of the optical system, the present invention enables readout of such a small mark with high signal strength. Still further, with the foregoing arrangement, when information is stored in a recording layer, it is possible to selectively carry out readout in an area smaller than the spot size of an irradiation light beam, as with the foregoing example. Accordingly, it is possible to provide an optical information recording medium enabling secure and highly accurate readout of information recorded with high density, compared to a conventional method not using a temperature responsive layer and a light absorption layer.

Note that, the foregoing optical information recording medium for recording information and for reproducing the information by irradiation of a light beam may be a medium operating as a recording/readout RAM (such as a phase change medium, or an magnetooptical (MO) recording medium), or a write-once medium (one using coloring material, an inorganic film etc.). As a typical structure for such media, an optical information recording medium including a recording layer for optically recording information and optically reproducing the information by irradiation of a light beam is further provided with a temperature responsive layer whose transmittance for irradiation of a light beam changes with an increase in temperature caused by the irradiation.

Also, the light absorption layer can change the quantity of light absorbed (i.e. reflectance and/or transmittance) in the temperature responsive layer by absorbing a light beam. Further, an example of the temperature responsive layer whose reflectance changes with a change in temperature may be a structure having two layers: a layer made of a material whose refractive index (real part/imaginary part) changes depending on temperature, such as a ZnO (Zinc Oxide); and a reflection layer made of an Al film or the like. In such a structure, the light absorption layer is preferably formed between the layer made of a material whose refractive index changes depending on temperature and the reflection layer.

It is preferable that the reflectance and/or the transmittance of the temperature responsive layer changes by an interference effect between a reflection light of the light beam reflected on one face of the temperature responsive layer and a reflection light of the light beam reflected on the other face of the temperature responsive layer. Further, it is preferable that the temperature responsive layer is arranged so that a low transmittance wavelength domain (the domain from the vicinity of the maximum value of the transmittance closest to the wavelength of the irradiation light beam in the longer wavelength side, to the vicinity of the absorption edge of the shorter wavelength side) generated by absorption of a shorter wavelength side at an ordinary temperature is shifted toward a longer wavelength side or a shorter wavelength side by a certain degree of rise in temperature of the temperature responsive layer, so that a spectral transmittance and/or a spectral reflectance with respect to the wavelength of a readout light beam changes. Further, for the spectral reflectance characteristic of the temperature responsive layer, the minimum value due to the optical interference effect between a reflection light of the light beam reflected on one face of the temperature responsive layer and a reflection light of the light beam reflected on the other face preferably exist in the vicinity of the wavelength of a light beam.

With the foregoing arrangement, by causing the optical interference effect between a reflection light of the light beam reflected on one face of the temperature responsive layer and a reflection light of the light beam reflected on the other face, and using the optical interference effect to control change of temperature for the transmittance characteristic and/or the reflectance characteristic of the temperature responsive layer, it is possible to increase the change (degree of modulation) of the transmittance and/or the reflectance with the change in temperature. Consequently, the mask effect by the temperature responsive layer further improves, thus securely and highly accurately carrying out readout with a smaller diameter than that of irradiation light spot of a light beam.

If the temperature responsive layer is one whose transmittance for an irradiated light beam decreases or increases with a rise in temperature, it is possible to improve readout resolution by decreasing or increasing the transmittance of a high temperature portion in the temperature responsive layer.

As mentioned previously, the mask layer disclosed in Japanese Laid-Open Patent Application Nos. 5-12673/1993 and 5-12715/1993 causes a problem of degradation of mask effect when recording and/or readout is repeatedly performed. On the other hand, the foregoing structure uses the temperature responsive layer so as to decrease or increase the transmittance of the high temperature section. Since the temperature responsive layer can be made of a material which is not dissolved when the temperature rises upon recording or readout, the mask effect of the temperature responsive layer does not decrease even when recording and/or readout is repeatedly performed. On this account, it is possible to provide an optical information recording medium superior in durability.

The temperature responsive layer preferably contains a metal oxide whose reflectance and/or transmittance changes with an increase in temperature, particularly a zinc oxide.

With the foregoing arrangement, since the temperature responsive layer is not dissolved when the temperature rises upon recording or readout, the mask effect of the temperature responsive layer does not decrease even when recording and/or readout is repeatedly performed. On this account, it is possible to provide an optical information recording medium superior in durability.

It is preferable that the light absorption layer is formed on the temperature responsive layer on a surface opposite to a surface irradiated with a light beam. In other words, it is preferable that the light absorption layer is provided on the rear surface of the temperature responsive layer. Further, it is preferable that the light absorption layer contains a phase change material, a magnetooptical material, or an alloy of the foregoing materials, it is more preferable that the light absorption layer contains Si, Ge, AgInSbTe, GeSbTe, TbFeCo, DyFeCo, GdFeCo, or an alloy of two or more types of the foregoing metals, and it is particularly preferable that the light absorption layer contains Si. Still further, it is preferable that the temperature responsive layer and the light absorption layer are adjacent to each other.

With the foregoing arrangements, since a light beam irradiated especially in an effective manner can be exchanged into heat, the temperature of the temperature responsive layer can further rise in a portion where the temperature rises from the light irradiation. That is, it is possible to further increase a rise in temperature of the temperature responsive layer caused by the irradiation of a light beam. This can significantly change the transmittance and/or reflectance of the temperature responsive layer in a portion where the temperature rises, thus providing an optical information recording medium further enabling secure and highly accurate readout of information.

Further, in an optical information recording medium including a recording layer for optically recording information, it is preferable that the temperature responsive layer is provided on the rear surface of the recording layer which is opposite to the surface irradiated with the recording/readout beam. The foregoing arrangement in which the temperature responsive layer is provided on a the recording layer on a surface opposite to that irradiated with the recording/readout beam is more advantageous in the following regard than the arrangement of Japanese Laid-Open Patent Application Nos. 5-12673/1993 and 5-12715/1993, which includes a mask layer on the light irradiation surface of the recording layer. That is, in the structure of Japanese Laid-Open Patent Application Nos. 5-12673/1993 and 5-12715/1993 in which the recording film is provided on the substrate, the mask layer is provided on the light irradiation surface of the recording film, and therefore, the mask layer absorbs at least a certain part of the whole quantity of the light beam entering to the recording layer. This may cause such as a decrease of recording sensitivity or an increase of readout noise and degrades signal quality. In contrast, the foregoing structure in which the temperature responsive layer is provided on the recording layer on a surface opposite to that irradiated with the recording/ readout beam can more easily raise temperature of the temperature responsive layer by using optical interference effect. Consequently, readout may be carried out with lower laser power, thus realizing an optical information recording medium offering high readout sensitivity.

Thus, in an optical information recording medium of the present invention, a minute recording mark less than a diffraction limit of a readout light beam can be reproduced by a change in reflectance and/or transmittance with a change in temperature of the temperature responsive layer caused by the light beam and the light absorption layer.

A readout method according to the present invention for an optical information recording medium includes the steps of: irradiating the optical information recording medium with a light beam so as to generate a high temperature section and a low temperature section in a light beam spot of the temperature responsive layer, so that the transmittance of the temperature responsive layer decreases in the high temperature section, and the high temperature section is further heated by the light absorption layer; and reproducing the information with light transmitted through the low temperature section of the temperature responsive layer. Further, a readout method according to the present invention for an optical information recording medium may be a method including the steps of: irradiating the optical information recording medium with a light beam so as to generate a high temperature section and a low temperature section in a light beam spot of the temperature responsive layer, so that the transmittance of the temperature responsive layer increases in the high temperature section, and the high temperature section is further heated by the light absorption layer; and reproducing the information with light transmitted through the high temperature section of the temperature responsive layer.

With the foregoing methods, readout can be selectively carried out in an area smaller than the spot size of a readout light beam by reproducing the information with light transmitted through the low temperature section or the high temperature section of the temperature responsive layer, thus securely and highly accurately carrying out readout of an optical information recording medium in which information is recorded with high density.

In the readout method according to the present invention, readout power is preferably controlled to optimize the super-resolution effect (by maximizing signal amplitude). More specifically, for control of irradiation power of a light beam upon signal readout, it is preferable that a maximum value of a C/N ratio or readout signal amplitude, for example, corresponding to an optimum value of readout power strength is previously obtained to carry out readout while feeding back the maximum value.

A recording method according to the present invention for an optical information recording medium includes the steps of: irradiating the optical information recording medium with a light beam so as to generate a high temperature section and a low temperature section in a light beam spot of the temperature responsive layer, so that the transmittance of the temperature responsive layer decreases in the high temperature section, and the high temperature section is further heated by the light absorption layer; and heating a recording layer with light transmitted through the low temperature section of the temperature responsive layer. Further, a recording method according to the present invention for an optical information recording medium, includes the steps of: irradiating the optical information recording medium with a light beam so as to generate a high temperature section and a low temperature section in a light beam spot of the temperature responsive layer, so that the transmittance of the temperature responsive layer increases in the high temperature section, and the high temperature section is further heated by the light absorption layer; and heating a recording layer with light transmitted through the high temperature section of the temperature responsive layer.

With the foregoing methods, readout can be selectively carried out in an area smaller than the spot size of a readout light beam by reproducing the information with light transmitted through the low temperature section or the high temperature section of the temperature responsive layer, thus securely and highly accurately carrying out recording of an optical information recording medium in which information is recorded with high density.

A readout method according to the present invention for an optical information recording medium is a readout method for the foregoing optical information recording medium, and uses the foregoing temperature responsive layer and light absorbing layer to reproduce a minute recording mark less than a diffraction limit of a readout light beam. An optical information readout device according to the present invention reproduces a minute recording mark less than a diffraction limit of a readout light beam with the foregoing optical information recording medium and the foregoing readout method.

With the foregoing invention, it is possible to reproduce a minute recording mark less than a diffraction limit of a readout light beam.

A recording method according to the present invention for an optical information recording medium is a recording method for the foregoing optical information recording medium, and uses at least the foregoing temperature responsive layer and light absorption layer to record a minute recording mark less than a diffraction limit of a recording/ readout beam. An optical information recording device according to the present invention records a minute recording mark less than a diffraction limit of a light beam with the foregoing optical information recording medium and the foregoing recording method.

With the above invention, it is possible to record a minute recording mark less than a diffraction limit of a readout light beam.

The Embodiments and concrete examples of implementation discussed in the foregoing detailed explanation serve solely to illustrate the technical details of the present invention, which should not be narrowly interpreted within the limits of such Embodiments and concrete examples, but rather may be applied in many variations within the spirit of the present invention, provided such variations do not exceed the scope of the patent claims set forth below.

What is claimed is:

1. An optical information recording medium storing on a substrate information which can be reproduced by irradiation of a light beam, comprising:
   a temperature responsive layer whose reflectance and/or transmittance changes with a change in temperature caused by the irradiation of a light beam;
   a light absorption layer which raises a temperature of the temperature responsive layer by absorbing the light beam to exchange the light beam into heat; and
   a heat insulating layer which enables an efficient rise in temperature of the temperature responsive layer,
   wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
   the light absorption layer is a film formed from one of Si, Ge, AgInSbTe, GeSbTe, TbFeCo, DyFeCo, and GdFeCo, and the heat insulating layer is a film formed from one of SiN and AlN, and the temperature responsive layer, the light absorption layer, the heat insulating layer, and the substrate being provided in this order from a side from which the light beam enters.

2. The optical information recording medium as set forth in claim 1, wherein:

the reflectance and/or the transmittance of the temperature responsive layer with respect to the irradiation of the light beam changes by an interference effect between a reflection light of the light beam reflected on one face of the temperature responsive layer and a reflection light of the light beam reflected on the other face of the temperature responsive layer.

3. The optical information recording medium as set forth in claim 1, wherein:

the temperature responsive layer is arranged so that a low transmittance wavelength domain generated by absorption of a shorter wavelength side at an ordinary temperature is shifted toward a longer wavelength side or a shorter wavelength side by a certain degree of rise in temperature of the temperature responsive layer, so that a spectral transmittance and/or a spectral reflectance with respect to the wavelength of a readout light beam changes.

4. The optical information recording medium as set forth in claim 1, wherein:

the temperature responsive layer contains a metal oxide whose reflectance and/or transmittance changes with an increase in temperature.

5. The optical information recording medium as set forth in claim 1, wherein:

the temperature responsive layer contains a zinc oxide.

6. The optical information recording medium as set forth in claim 1, wherein:

the light absorption layer contains a phase change material, a magnetooptical material, or an alloy of the foregoing materials.

7. The optical information recording medium as set forth in claim 1, wherein:

the light absorption layer contains Si, Ge, AgInSbTe, GeSbTe, TbFeCo, DyFeCo, GdFeCo, or an alloy of two or more types of the foregoing metals.

8. The optical information recording medium as set forth in claim 1, wherein:

the temperature responsive layer and the light absorption layer are adjacent to each other.

9. The optical information recording medium as set forth in claim 1, wherein:

a minute recording mark less than a diffraction limit of a readout light beam can be reproduced by a change in reflectance and/or transmittance with a change in temperature of the temperature responsive layer caused by the light beam, the light absorption layer, and the heat insulating layer.

10. An optical information recording medium for storing information by irradiation of a light beam and for allowing readout of the information by irradiation of a light beam, comprising:

a recording layer for recording information;

a temperature responsive layer whose reflectance and/or transmittance changes with a change in temperature caused by the irradiation of a light beam;

a light absorption layer which raises a temperature of the temperature responsive layer by absorbing the light beam to exchange the light beam into heat; and a heat insulating layer which enables an efficient rise in temperature of the temperature responsive layer, wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$, the light absorption layer is a film formed from one of Si, Ge, AgInSbTe, GeSbTe, TbFeCo, DyFeCo, and GdFeCo, and the heat insulating layer is a film formed from one of SiN and AlN, and the recording layer, the temperature responsive layer, the light absorption layer and the heat insulating layer, being provided in this order from a side from which the light beam is incident.

11. The optical information recording medium as set forth in claim 10, wherein:

the reflectance and/or the transmittance of the temperature responsive layer with respect to the irradiation of a light beam changes by an interference effect between a reflection light of the light beam reflected on one face of the temperature responsive layer and a reflection light of the light beam reflected on the other face of the temperature responsive layer.

12. The optical information recording medium as set forth in claim 10, wherein:

the temperature responsive layer is arranged so that a low transmittance wavelength domain generated by absorption of a shorter wavelength side at an ordinary temperature is shifted toward a longer wavelength side or a shorter wavelength side by a certain degree of rise in temperature of the temperature responsive layer, so that a spectral transmittance and/or a spectral reflectance with respect to the wavelength of a readout light beam changes.

13. The optical information recording medium as set forth in claim 10, wherein:

the temperature responsive layer contains a metal oxide whose reflectance and/or transmittance changes with an increase in temperature.

14. The optical information recording medium as set forth in claim 10, wherein:

the temperature responsive layer contains a zinc oxide.

15. The optical information recording medium as set forth in claim 10, wherein:

the light absorption layer contains a phase change material, a magnetooptical material, or an alloy of the foregoing materials.

16. The optical information recording medium as set forth in claim 15, wherein:

the light absorption layer contains Si, Ge, AgInSbTe, GeSbTe, TbFeCo, DyFeCo, GdFeCo, or an alloy of two or more types of the foregoing metals.

17. The optical information recording medium as set forth in claim 10, wherein:

the temperature responsive layer and the light absorption layer are adjacent to each other.

18. The optical information recording medium as set forth in claim 10, wherein:

a minute recording mark less than a diffraction limit of a readout light beam can be reproduced by a change in reflectance and/or transmittance with a change in temperature of the temperature responsive layer caused by the light beam, the light absorption layer, and the heat insulating layer.

19. A readout method for an optical information recording medium storing, on a substrate, information which can be reproduced by irradiation of a light beam, the optical information recording medium comprising:
- a temperature responsive layer whose reflectance and/or transmittance changes with a change in temperature caused by the irradiation of a light beam;
- a light absorption layer which raises a temperature of the temperature responsive layer by absorbing the light beam to exchange the light beam into heat; and
- a heat insulating layer which enables an efficient rise in temperature of the temperature responsive layer;
- wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
- the light absorption layer is a film formed from one of Si, Ge, AgInSbTe, GeSbTe, TbFeCo, DyFeCo, and GdFeCo, and
- the heat insulating layer is a film formed from one of SiN and AlN, and
- the temperature responsive layer, the light absorption layer, the heat insulating layer and the substrate being provided in this order from a side from which the light beam enters;
- the method comprising the steps of:
  - irradiating the optical information recording medium with a light beam so as to generate a high temperature portion and a low temperature portion in a light beam spot of the temperature responsive layer, so that the transmittance of the temperature responsive layer decreases in the high temperature portion, and the high temperature portion is further heated by the light absorption layer and the heat insulating layer; and
  - reproducing the information with a light transmitted through the low temperature portion of the temperature responsive layer.

20. A readout method for an optical information recording medium storing, on a substrate, information which can be reproduced by irradiation of a light beam, the optical information recording medium comprising:
- a temperature responsive layer whose reflectance and/or transmittance changes with a change in temperature caused by the irradiation of a light beam;
- a light absorption layer which raises a temperature of the temperature responsive layer by absorbing the light beam to exchange the light beam into heat; and
- a heat insulating layer which enables an efficient rise in temperature of the temperature responsive layer;
  - wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
  - the light absorption layer is a film formed from one of Si, Ge, AgInSbTe, GeSbTe, TbFeCo, DyFeCo, and GdFeCo, and
  - the heat insulating layer is a film formed from one of SiN and AlN, and
- the temperature responsive layer, the light absorption layer, the heat insulating layer and the substrate being provided in this order from a side from which the light beam enters,
  - the method comprising the steps of:
    - irradiating the optical information recording medium with a light beam so as to generate a high temperature portion and a low temperature portion in a light beam spot of the temperature responsive layer, so that the transmittance of the temperature responsive layer increases in the high temperature portion, and the high temperature portion is further heated by the light absorption layer and the heat insulating layer; and
    - reproducing the information with a light transmitted through the high temperature portion of the temperature responsive layer.

21. An optical information readout device, comprising:
an optical information recording medium; and
an optical pickup for irradiating the optical information recording medium with a light beam,
wherein:
  the optical information recording medium stores, on a substrate, information which can be reproduced by irradiation of a light beam, the optical information recording medium including:
  a temperature responsive layer whose reflectance and/or transmittance changes with a change in temperature caused by the irradiation of a light beam;
  a light absorption layer which raises a temperature of the temperature responsive layer by absorbing the light beam to exchange the light beam into heat; and
  a heat insulating layer which enables an efficient rise in temperature of the temperature responsive layer;
    wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
    the light absorption layer is a film formed from one of Si, Ge, AgInSbTe, GeSbTe, TbFeCo, DyFeCo, and GdFeCo, and
    the heat insulating layer is a film formed from one of SiN and AlN, and
  the temperature responsive layer, the light absorption layer, the heat insulating layer and the substrate being provided in this order from a side from which the light beam enters; and
  the optical pickup uses at least the temperature responsive layer, the light absorption layer and the heat insulating layer to reproduce information from a minute recording mark less than a diffraction limit of a readout light beam.

22. An optical information readout device as set forth in claim 21, wherein:
The temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$;
the light absorption layer is a film formed from one of Si, Ge, AgInSbTe, GeSbTe, TbFeCo, DyFeCo, and GdFeCo; and
the heat insulating layer is a film formed from one of SiN and AlN.

23. A readout method for an optical information recording medium storing, on a substrate, information which can be reproduced by irradiation of a light beam, the optical information recording medium comprising:
- a temperature responsive layer whose reflectance and/or transmittance changes with a change in temperature caused by the irradiation of a light beam;
- a light absorption layer which raises a temperature of the temperature responsive layer by absorbing the light beam to exchange the light beam into heat; and
- a heat insulating layer which enables an efficient rise in temperature of the temperature responsive layer,
  - wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
  - the light absorption layer is a film formed from one of Si, Ge, AgInSbTe, GeSbTe, TbFeCo, DyFeCo, and GdFeCo, and
  - the heat insulating layer is a film formed from one of SiN and AlN, and the temperature responsive layer, the light absorption layer, the tint insulation layer, and the substrate being provided in this order from a side from which the light beam enters;

the method comprising the step of:
using at least the temperature responsive layer, the light absorption layer, and the heat insulating layer, reproducing a minute recording mark less than a diffraction limit of a readout light beam.

24. A readout method for an optical information recording medium as set forth in claim 23, wherein:
the temperature responsive layer is a film formed from one of $ZnO$, $ZnS$, $SnO_2$, $CeO_2$, $NiO_2$, $In_2O_3$, $TiO_2$, $Ta_2O5$, $VO_2$, and $SrTiO_3$;
the light absorption layer is a film formed from one of Si, Ge, AgInSbTe, GeSbTe, TbFeCo, DyFeCo, and GdFeCo; and
the heat insulating layer is film formed from one of SiN and AlN.

25. A recording and/or readout method for an optical information recording medium for storing information by irradiation of a light beam and for allowing readout of the information by irradiation of a light beam, the optical information recording medium comprising:
a recording layer for recording information
a temperature responsive layer whose reflectance and/or transmittance changes with a change in temperature caused by the irradiation of a light beam;
a light absorption layer which raises a temperature of the temperature responsive layer by absorbing the light beam to exchange the light beam into heat; and
a heat insulating layer which enables an efficient rise in temperature of the temperature responsive layer,
wherein the temperature responsive layer is a film formed from one of $ZnO$, $ZnS$, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating layer is a film formed from one of SiN and AlN, and
the recording layer, the temperature responsive layer, the light absorption layer, and he heat insulating layer being provided in this order from a side on which the light beam is incident
the method comprising the step of:
using at least the temperature responsive layer, the light absorption layer, and the heat insulating layer, reproducing a minute recording mark less than a diffraction limit of a readout light beam.

26. A recording and/or readout method for an optical information recording medium for storing information by irradiation of a light beam and for allowing readout of the information by Irradiation of a light beam, the optical information recording medium comprising:
a recording layer or recording information
a temperature responsive layer whose reflectance and/or transmittance changes with a change in temperature caused by the irradiation of a light beam;
a light absorption layer which raises a temperature of the temperature responsive layer by absorbing the light beam to exchange the light beam into heat and
a heat insulating layer which enables an efficient rise in temperature of the temperature responsive layer,
wherein the temperature responsive layer is a film fanned from one of $ZnO$, $ZnS$, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating layer is a film formed from one of SiN and AlN, and
the recording layer, the temperature responsive layer, the light absorption layer, and the heat insulating layer being provided in the order from a side on which the light beam is incident,
the method comprising the steps of:
irradiating the optical information recording medium with a light beam so as to generate a high temperature portion and a low temperature portion in a light beam spot of the temperature responsive layer, so that the transmittance of the temperature responsive layer decreases in the high temperature portion, and the high temperature portion is further heated by the light absorption layer and the heat insulating layer and
reproducing the information with a light transmitted through the low temperature portion of the temperature responsive layer.

27. A recording and/or readout method for an optical information recording medium for storing information by irradiation of a light beam and for allowing readout of the information by irradiation of a light beam, the optical information recording medium comprising:
a recording layer for recording information:
a temperature responsive layer whose reflectance and/or transmittance changes with a change in temperature caused by the irradiation of a light beam;
a light absorption layer which raises a temperature of the temperature responsive layer by absorbing the light beam to exchange the light beam into heat; and
a heat insulating layer which enables an efficient rise in temperature of the temperature responsive layer,
wherein the temperature responsive layer is a film formed from one of $ZnO$, $ZnS$, $SnO_2$, $CeO_2$, $NiO_2$, $In_2O_3$, $TiO_2$, $Ta_2O5$, $VO_2$, and $SrTiO_3$,
the light absorprion layer is a film formed from one of Si, Ge, AgInSbTe, GeSbTe, TbFeCo, DyFeCo, and GdFeCo, and
the heat insulating layer is a film formed from one of SiN and AlN, and
the recording layer, the temperature responsive layer, the light absorption layer, and the heat insulating layer being provided in this order from a side on which the light beam is incident,
the method comprising the steps of:
irradiating the optical information recording medium with a light beam so as to generate a high temperature portion and a low temperature portion in a light beam spot of the temperature responsive layer, so tat the transmittance of the temperature responsive layer increases in the high temperature portion, and the high temperature portion is further heated by the light absorption layer and the heat insulating layer; and
reproducing the information with a light transmitted through the high temperature portion of the temperature responsive layer.

28. An optical information recording medium storing, on a substrate, information which can be reproduced by irradiation of a light beam, comprising:
in this order from a side on which the light beam is incident;
a film formed from one selected from the group consisting of $ZnO$, $ZnS$, $SnO_2$, $CeO_2$, $NiO_2$, $In_2O_3$, $TiO_2$, $Ta_2O5$, $VO_2$, and $SrTiO_3$;

a film formed from Si, Ge, AgInSbTe, GeSbTe, TbFeCo, DyFeCo, and GdFeCo;
a film formed from one of SiN and AlN; and a substrate.

29. An optical information readout device, comprising:
an optical information recording medium; and
an optical pickup for irradiating the optical information recording medium with a light beam,
wherein:
the optical information recording medium stores, on a substrate, information which can be reproduced by irradiation of a light bean,, the optical information recording medium including:
a temperature responsive layer whose reflectance and/or transmittance changes with a change in temperature caused by the irradiation of a light beam;
a light absorption layer which raises a temperature of the temperature responsive layer by absorbing the light beam to exchange the light beam into heat; and
a heat insulating layer which enables an efficient rise in temperature of the temperature responsive layer,
wherein the temperature responsive layer is a film fanned from one of ZnO, ZnS, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulation layer is a film formed from one of SiN and AlN. and
the temperature responsive layer, the light absorption layer, the heat insulating layer, and the substrate being provided in this order from a side from which the light beam enters; and the optical pickup:
irradiates the optical information recording medium with a light beam so as to generate a high temperature portion and a low temperature portion in a light beam spot of the temperature responsive layer, so that the transmittance of the temperature responsive layer decreases in the high temperature portion, and the high temperature portion is further heated by the light absorption layer and the heat insulating layer; and
reproduces the information with a light transmitted through the low temperature portion of the temperature responsive layer.

30. An optical information readout device, comprising:
an optical information recording medium; and
an optical pickup for irradiating the optical information recording medium with a light beam,
wherein:
the optical information recording medium stores on a substrate, information which can be reproduced by irradiation of a light beam, the optical information recording medium including:
a temperature responsive layer whose reflectance and/or transmittance changes with a change in temperature caused by the irradiation of a light beam; and
a light absorption layer which raises a temperature of the temperature responsive layer by absorbing the light beam to exchange the light beam into heat: and
a heat insulating layer which enables an efficient rise in temperature of the temperature responsive layer,
wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating lever is a film formed from one of SiN and AlN, and
the temperature responsive layer, the light absorption layer, the heat insulating layer, end the substrate being provided in this order from a side from which the light beam enters; and
the optical pickup:
irradiates the optical information recording medium with a light beam so as to generate a high temperature portion and a low temperature portion in a light beam spot of the temperature responsive layer, so that the transmittance of the temperature responsive layer increases in the high temperature portion, and the high temperature portion is further heated by the light absorption layer and the heat insulating layer and
reproduces the information with a light transmitted through the high temperature portion of the temperature responsive layer.

31. An optical information recording/readout device, comprising:
an optical information recording medium; and
an optical pickup for irradiating the optical information recording medium with a light beam,
wherein:
the optical information recording medium is for storing information by irradiation of a light beam and for allowing recording and/or readout of the information by irradiation of a light beam, the optical information recording medium including:
a recording layer for recording information
a temperature responsive layer whose reflectance and/or transmittance changes with a change in temperature caused by the irradiation of a light beam; and a light absorption layer which raises a temperature of the temperature responsive layer by absorbing the light beam to exchange the light beam into heat; and a heat insulating layer which enables an efficient rise in temperature of the temperature responsive layer,
wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating layer is a film formed from one of SiN and AlN, and
the recording layer, the temperature responsive layer. the light absorption layer, and the heat insulating layer being provided in this order from a side on which the light beam is incident: and
the optical pickup uses at least the temperature responsive layer, the light absorption layer and the heat insulating layer, to reproduce a minute recording mark less than a diffraction limit of a readout light beam.

32. An optical information recording/readout device, comprising: an optical information recording medium; and an optical pickup for irradiating the optical information recording medium with a light beam,
wherein:
the optical information recording medium is for storing information by irradiation of a light beam and for allowing recording and/or readout of the information by irradiation of a light beam, the optical information recording medium including;

a recording layer for recording information:
a temperature responsive layer whose reflectance and/or transmittance changes with a change in temperature caused by the irradiation of a light beam;
a light absorption layer which raises a temperature of the temperature responsive layer by absorbing the light beam to exchange the light beam into heat; and
a heat insulating layer which enables an efficient rise in temperature of the temperature responsive layer,
wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating layer is a film formed from one of SiN and AlN. and
the recording layer, the temperature responsive layer the light absorption layer, and the heat insulating layer being provided in this order from a side on which the light beam is incident; and
the optical pickup:
irradiates the optical information recording medium with a light beam so as to generate a high temperature portion and a low temperature portion in a light beam spot of the temperature responsive layer, so that the transmittance of the temperature responsive layer decreases in the high temperature portion, and the high temperature portion is further heated by the light absorption layer and the heat insulating layer and reproduces the information with a light transmitted through the low temperature portion of the temperature responsive layer.

33. An optical information recording/readout device, comprising:
an optical information recording medium; and
an optical pickup for irradiating the optical information recording medium with a light beam,
wherein:
the optical information recording medium is for storing information by irradiation of a light beam and for allowing recording and/or readout of the information by irradiation of a light beam, the optical information recording medium including:
a recording layer for recording information;
a temperature responsive layer whose reflectance and/or transmittance changes with a change in temperature caused by the irradiation of a light beam;
a light absorption layer which raises a temperature of the temperature responsive layer by absorbing the light beam to exchange the light beam into heat: and
a heat insulating layer which enables an efficient rise in temperature of the temperature responsive layer,
wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating layer is a film formed from one of SiN and AlN, and
the recording layer, the temperature responsive layer, the light absorption layer, and the heat insulating layer being provided in this order from a side on which the light beam is incident: and
the optical pickup:
irradiates the optical information recording medium with a light beam so as to generate a high temperature portion and a low temperature portion in a light beam spot of the temperature responsive layer, so that the transmittance of the temperature responsive layer increases in the high temperature portion, and the high temperature portion is further heated by the light absorption layer and the heat insulating layer and
reproduces the information with a light transmitted through the high temperature portion of the temperature responsive layer.

34. An optical information recording medium storing information which is reproduced by irradiation of a light beam, comprising:
a temperature responsive layer whose reflectance and/or transmittance changes according to a change in temperature caused by the irradiation of a light beam;
a light absorption layer which changes the temperature of the temperature responsive layer; and
a heat insulating layer which enables an efficient rise in temperature of the temperature responsive layer,
wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating layer is a film formed from one of SiN and AlN,and
wherein the light absorption layer contains a phase change material, a magnetooptical material, or an alloy of the foregoing materials.

35. The optical information recording medium as set forth in claim 34, wherein:
the light absorption layer contains Si, Ge, AgInSbTe, GeSbTe, TbFeCo, DyFeCo, GdFeCo, or an alloy of two or more of the foregoing metals.

36. An optical information recording medium for storing information by irradiation of a light beam and for reading out the information by irradiation of a light beam, comprising a temperature responsive layer whose reflectance and/or transmittance changes with a change in temperature caused by the irradiation. of a light beam;
a light absorption layer which changes a temperature of the temperature responsive layer; and
a heat insulating layer which enables an efficient rise in temperature of the temperature responsive layer,
wherein the temperature responsive layer is a film formed from one of ZnO, ZnS, $SnO_2$, $CeO_2$, $NiO_2$, $In_2O_3$, $TiO_2$, $Ta_2O5$, $VO_2$, and $SrTiO_3$,
the light absorption layer is a film formed from one of Si, Ge, AgInSbTe, GeSbTe, TbFeCo, DyFeCo, and GdFeCo, and
the heat insulating layer is a film formed from one of SiN and AlN, and
wherein the light absorption layer contains a phase change material, a magnetooptical material, or an alloy of the foregoing materials.

37. The optical information recording medium as set forth in claim 36, wherein: the light absorption layer contains Si, Ge, AgInSbTe, GeSbTe, TbFeCo, DyFeCo, GdFeCo, or an alloy of two or more of the foregoing metals.

* * * * *